United States Patent
Feinauer et al.

(10) Patent No.: US 10,839,788 B2
(45) Date of Patent: Nov. 17, 2020

(54) SYSTEMS AND METHODS FOR SELECTING ACCENT AND DIALECT BASED ON CONTEXT

(71) Applicant: i2x GmbH, Berlin (DE)

(72) Inventors: Christoph Johann Feinauer, Pfaffenhofen-Weiler (DE); Samuel Frank Jet Brown, Wedding (AU)

(73) Assignee: I2X GMBH, Berlin (DE)

( * ) Notice: Subject to any disclaimer, the term of this patent is extended or adjusted under 35 U.S.C. 154(b) by 153 days.

(21) Appl. No.: 16/219,778

(22) Filed: Dec. 13, 2018

(65) Prior Publication Data

US 2020/0193972 A1    Jun. 18, 2020

(51) Int. Cl.

| | |
|---|---|
| *G10L 15/22* | (2006.01) |
| *G10L 15/30* | (2013.01) |
| *G06F 3/16* | (2006.01) |
| *G10L 15/07* | (2013.01) |
| *G10L 15/183* | (2013.01) |
| *G06N 20/10* | (2019.01) |
| *G10L 17/02* | (2013.01) |
| *G06F 40/44* | (2020.01) |

(52) U.S. Cl.
CPC ............ *G10L 15/075* (2013.01); *G06F 40/44* (2020.01); *G06N 20/10* (2019.01); *G10L 15/183* (2013.01); *G10L 17/02* (2013.01)

(58) Field of Classification Search
CPC ............ G10L 15/22; G10L 15/30; G06F 3/16
See application file for complete search history.

(56) References Cited

U.S. PATENT DOCUMENTS

| | | | | |
|---|---|---|---|---|
| 8,583,432 | B1* | 11/2013 | Biadsy | G10L 15/18 |
| | | | | 704/235 |
| 2006/0122840 | A1* | 6/2006 | Anderson | G10L 15/22 |
| | | | | 704/275 |
| 2009/0083249 | A1* | 3/2009 | Basson | G10L 15/26 |
| 2010/0324894 | A1* | 12/2010 | Potkonjak | G06F 40/58 |
| | | | | 704/235 |
| 2013/0226576 | A1* | 8/2013 | Jaiswal | G10L 13/033 |
| | | | | 704/235 |
| 2015/0046158 | A1* | 2/2015 | Efrati | G10L 21/003 |
| | | | | 704/235 |
| 2015/0336578 | A1* | 11/2015 | Lord | G08G 1/164 |
| | | | | 701/2 |
| 2018/0174595 | A1* | 6/2018 | Dirac | G10L 15/005 |
| 2018/0308487 | A1* | 10/2018 | Goel | G10L 15/22 |

FOREIGN PATENT DOCUMENTS

| | | |
|---|---|---|
| EP | 3 196 879 A1 | 7/2017 |
| WO | WO-2016/014970 A1 | 1/2016 |

* cited by examiner

*Primary Examiner* — Shreyans A Patel
(74) *Attorney, Agent, or Firm* — Foley & Lardner LLP

(57) ABSTRACT

Systems and methods for accent and dialect modification are disclosed. Discussed are a method for selecting a target dialect and accent to use to modify voice communications based on a context and a method for selectively modifying one or more words in voice communications in one dialect and accent with one or more vocal features of a different accent.

20 Claims, 8 Drawing Sheets

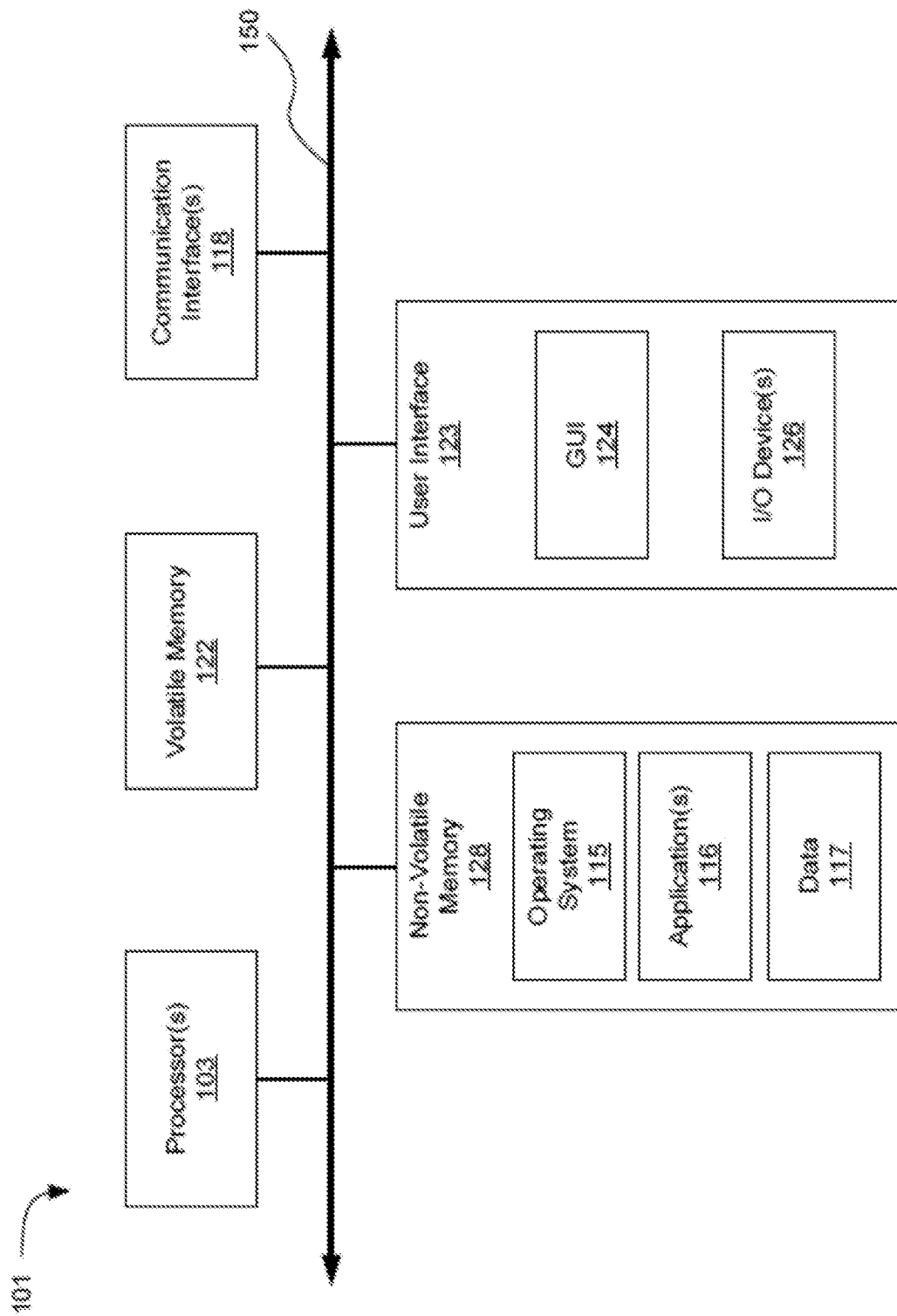

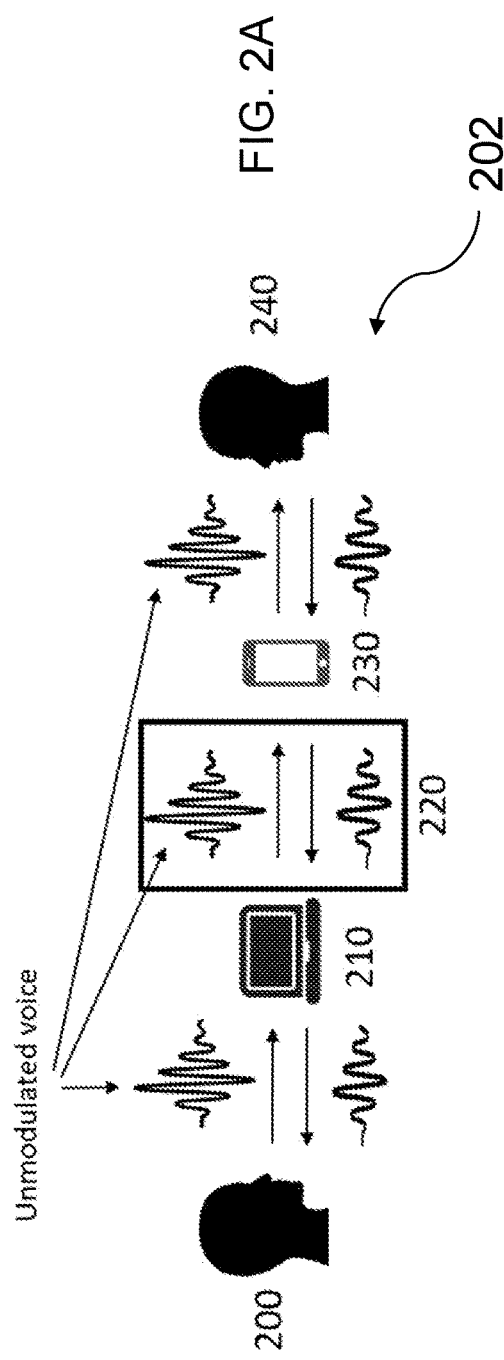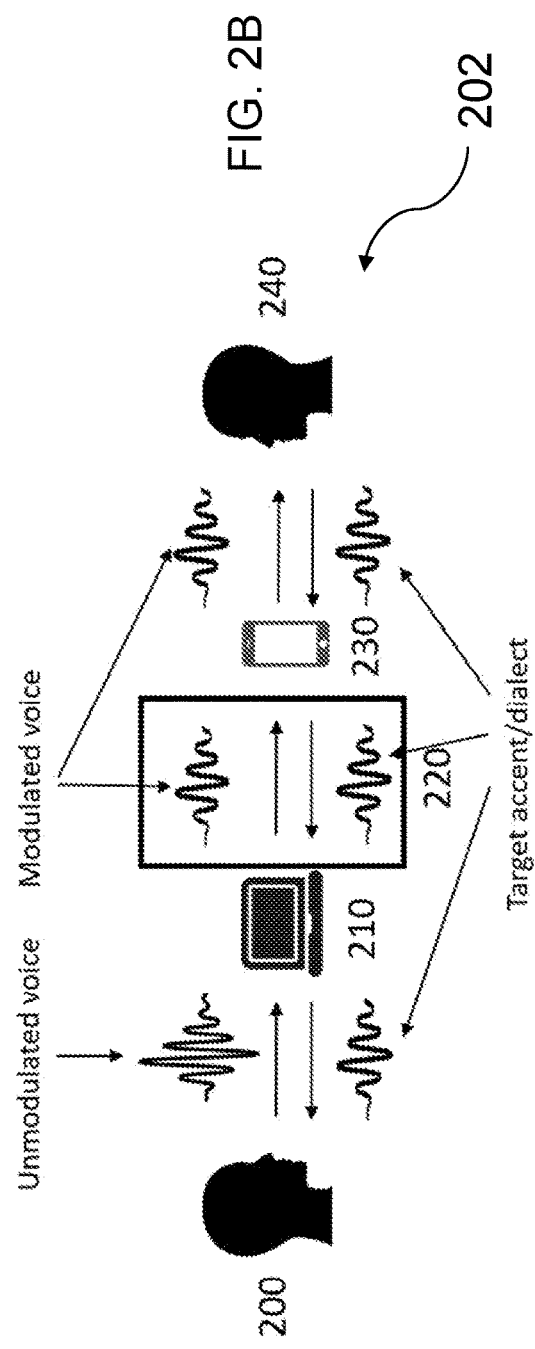

SYSTEMS AND METHODS FOR SELECTING ACCENT AND DIALECT BASED ON CONTEXT

FIELD OF THE DISCLOSURE

The present application generally relates to the field of accent and dialect modification. More particularly, the present disclosure relates to systems and methods for selectively modifying words in voice communications, and systems and methods for selecting a target dialect and accent to use to modify voice communication based on a context.

BACKGROUND OF THE DISCLOSURE

Effective communications between people across multiple dialects and/or accents can face a host of challenges, especially without visual cues. Communication between people with different dialects and/or can be fraught with miscommunication, misunderstanding, and negative opinions based on suboptimal pairings of language, dialect and/or accent between conversation partners.

BRIEF SUMMARY OF THE DISCLOSURE

One of the technical problems that the present disclosure addresses is the challenge of communicating effectively across multiple dialects and/or accents. For example, in a phone conversation, comprehending a person at the other end of a call who has a difficult to understand accent and/or dialect can pose a challenge. The present disclosure is directed to identifying an optimal or desired dialect and accent to use to achieve a desired or target goal in different scenarios and modifying vocal characteristics of audio communication of a user in real-time to more closely resemble the identified optimal dialect and/or accent. Man-machine interactions also face a challenge of heavily accented speakers or speakers with an unfamiliar dialect communicating with an interactive voice response (IVR) system or automated speech recognition (ASR) system, where the ASR or IVR is not able to comprehend the heavy accent or unfamiliar dialect.

Through a combination of meta tags, a dialect identification model, and voice modification software, one is able to modify a caller's voice to a prescribed or caller-selected accent and/or dialect. However, this may not be the optimal or desired accent and/or dialect for the situation or context. For example, this perspective can be highlighted in the following consideration of an American caller who wishes to place a call to an Irish person in Scotland. One may use meta tags to locate the call respondent to Scotland and modify the dialect of the American caller to Scottish accordingly. However, modifying the dialect of the American caller to Scottish may not be an optimal dialect to use for an Irish person in Scotland. An additional perspective can be understood in the scenario where one determines the accent of the call respondent to be Irish and modifies the accent of the American caller to Irish accordingly. However, modifying the accent of the American caller to Irish may not be an optimal dialect to use in the context of achieving a desired outcome (e.g. closing a sale or building rapport with a client). Modifying the accent of the American caller to Irish may not necessarily be the most communication optimized dialect because replicating the dialect of a person does not necessarily imply the best possible dialect for that person to communicate with to achieve a goal. Similarly, with accent translation, a target accent is identified by the accent of the primary speaker. One concern with accent translation attempts to match the accents to each other is that it has even less optimization than modifying a dialect based on a target dialect. Therefore, it would be a significant improvement to existing technologies to select an optimal accent and/or dialect, or to generate an accent and/or dialect based on optimized data which may not be a prescribed dialect, given the context of a call.

In some implementations, the present solution can optimize an accent and/or dialect for a specific context by taking into account factors that could play a role in the success of a conversation. Duplicating a dialect and/or accent or using the prevalent dialect and/or accent of a region in order to communicate is not always sufficient in a given context. The present disclosure discusses a solution, which, in some implementations, can modify an accent and/or dialect based on a machine learning identified best practice target accent and/or dialect.

In some implementations, the present solution can generate an accent and/or dialect which is not prescribed and modify a voice accordingly. For example, the optimal dialect and/or accent of a speaker may be identified as an accent and/or dialect with borrowed words from another accent and/or dialect. Instead of modifying a voice based on prescribed accents and having a generalized accent and/or dialect for an entire conversation (e.g. American or British English), the accent and/or dialect may be optimized based on successful vocal features of a range of other accents. In some implementations, the resulting accent or dialect may be an unusual or minor spoken accent or dialect which may sound similar to the prevalent accent or dialect of the region, with borrowed minor modifications to a small selection of words. For example, an optimal dialect or accent could resemble a mash up between English received pronunciation, with the American way of emphasizing certain words (e.g. in a sales context, the English received pronunciation may be universally recognized as being more persuasive or trustworthy, however American clients may understand familiar American words of brand names more easily in their native American accent than with a received English pronunciation). In this example, it might be more useful for more effective communication to have a dialect which can sound like received English, but some words pronounced in a more familiar American accent.

In some implementations, the method includes detecting, by a device, a first dialect and a first accent of a first voice in voice communications of a first participant of a plurality of participants participating in voice communications with a second participant of the plurality of participants detected to have a second voice with a second dialect and a second accent; identifying, by the device, a context of the voice communications; selecting, by the device, a target dialect and a target accent for voice communication of the first participant based at least on the context; determining, by the device, that the first dialect and the first accent differs from the target dialect and the target accent by a predetermined threshold; and causing, by the device responsive to the determination, modifications of at least a portion of voice communications of the first participant to use the target dialect and the target accent.

In some implementations, the target dialect is different from the first dialect and the second dialect, or the target accent is different from the first accent and the second accent. In some implementations, the device facilitates a communication channel providing the voice communications between communication devices of the plurality of participants. In some implementations, the context includes a type of call, the type of call comprising one of the following: a sales call, a service call and a support call. In some implementations, the context comprises a selected outcome for the voice communications. In some implementations, the context comprises one of an age, an industry or a geography associated with the voice communications.

In some implementations, the method further comprises identifying, by the device based at least on the context, one of a translation model, a translation dictionary or a translation database for the target dialect and the target accent. In some implementations, the method further comprises selecting, by the device, the target dialect and the target accent based on the context and at least one of the first accent and the first dialect or the second accent and the second dialect. In some implementations, the method further comprises selecting, by the device, the target dialect and the target accent based on one or more models trained with pairings of a plurality of dialects and accents for a plurality of contexts.

In another aspect, the present disclosure is directed to a system for selecting a target dialect and accent to use to modify voice communications for a context, the system comprising a device comprising one or more processors, coupled to memory and configured to: detect a first dialect and a first accent of a first voice in voice communications of a first participant of a plurality of participants participating in voice communications with a second participant of the plurality of participants detected to have a second voice with a second dialect and a second accent; identify a context of the voice communications; select a target dialect and a target accent for voice communication of the first participant based at least on the context; determine that the first dialect and the first accent differs from the target dialect and the target accent by a predetermined threshold; and cause, responsive to the determination, modifications of at least a portion of voice communications of the first participant to use the target dialect and the target accent.

In some implementations, the device is further configured to facilitate a communication channel for providing the voice communications between communication devices of the plurality of participants. In some implementations, the context comprises a type of call and a selected outcome for the type of call, the type of call comprising one of the following: a sales call, a service call and a support call. In some implementations, the context comprises one of an age, an industry or a geography associated with the voice communications. In some implementations, the device is further configured to select the target dialect and the target accent based on the context and at least one of the first accent and the first dialect or the second accent and the second dialect. In some implementations, the device is further configured to select the target dialect and the target accent based on one or more models trained with pairings of a plurality of dialects and accents for a plurality of contexts.

In another aspect, the present disclosure is directed to a non-transitory computer readable medium storing program instructions for causing one or more processors to: detect a first dialect and a first accent of a first voice in voice communications of a first participant of a plurality of participants participating in voice communications with a second participant of the plurality of participants detected to have a second voice with a second dialect and a second accent; identify a context of the voice communications; select a target dialect and a target accent for voice communication of the first participant based at least on the context; determine that the first dialect and the first accent differs from the target dialect and the target accent by a predetermined threshold; and cause, responsive to the determination, modifications of at least a portion of voice communications of the first participant to use the target dialect and the target accent.

In some implementations, the program instructions further cause the one or more processors to select the target dialect and the target accent based on the context and at least one of the first accent and the first dialect or the second accent and the second dialect. In some implementations, the program instructions further cause the one or more processors to select the target dialect and the target accent based on one or more models trained with pairings of a plurality of dialects and accents for a plurality of contexts. In some implementations, the context comprises a type of call and a selected outcome for the type of call, the type of call comprising one of the following: a sales call, a service call and a support call. In some implementations, the context comprises one of an age, an industry or a geography associated with the voice communications.

In another aspect, the present disclosure is directed to a method of selectively modifying one or more words in voice communications in one dialect and accent with one or more vocal features of a different accent, the method comprising: detecting, by a device, a first dialect and a first accent of one or more words in voice communications of a first participant of a plurality of participants participating in the voice communications, the voice communications of the first participant is received by the device and to be communicated via a communication channel to a communication device of a second participant of the plurality of participants; identifying, by the device, a target accent to selectively modify the one or more words in the voice communications in the first accent to the target accent; modifying, by the device, one or more vocal features of the voice communication of the one or more words in the first accent to a corresponding one or more vocal features of the target accent; and communicating, by the device, the voice communications comprising the modified one or more words via the communication channel to the communication device.

In some implementations, the method further comprises selecting the target accent based on a context for the voice communications. In some implementations, the context comprises one or more of the following: a type of call, a selected outcome for the call, an industry associated with the call, a geography associated with the call and an age associated with the call. In some implementations, the method further comprises selecting the target accent based on the context and one of a second dialect or a second accent of voice communications of the second participant. In some implementations, the method further comprises modifying the voice communications comprising the one or more words in the first accent to be pronounced in the target accent. In some implementations, the method further comprises identifying a target dialect to selectively modify the one or more words. In some implementations, the method further comprises modifying the voice communications comprising the one or more words in the first dialect to be pronounced in the target dialect. In some implementations, the method further comprises modifying the voice communications comprising the one or more words in the first dialect to be replaced with one or more words in the target dialect.

In another aspect, the present disclosure is directed to a system for selectively modifying one or more words in voice communications in one dialect and accent with one or more vocal features of a different accent, the system comprising: a device comprising one or more processors, coupled to memory and configured to detect a first dialect and a first accent of one or more words in voice communications of a first participant of a plurality of participants participating in the voice communications, wherein the voice communications of the first participant is received by the device and to be communicated via a communication channel to a communication device of a second participant of the plurality of participants; wherein the device is configured to: identify a target accent to selectively modify the one or more words in the voice communications in the first accent to the target accent; modify one or more vocal features of the voice communication of the one or more words in the first accent to a corresponding one or more vocal features of the target accent; and communicate the voice communications comprising the modified one or more words via the communication channel to the communication device.

In some implementations, the device is further configured to select the target accent based on a context for the voice communications. In some implementations, the context comprises one or more of the following: a type of call, an outcome for the call, an industry associated with the call, a geography associated with the call and an age associated with the call. In some implementations, the device is further configured to select the target accent based on a context and one of a second dialect or a second accent of voice communications of the second participant. In some implementations, the device is further configured to modify the voice communications comprising the one or more words in the first accent to be pronounced in the target accent. In some implementations, the device is further configured to identify a target dialect to selectively modify the one or more words. In some implementations, the device is further configured to modify the voice communications comprising the one or more words in the target dialect.

In another aspect, the present disclosure is directed to a non-transitory computer readable medium storing program instructions for causing one or more processors to: detect a first dialect and a first accent of one or more words in voice communications of a first participant of a plurality of participants participating in the voice communications, wherein the voice communications of the first participant is received by the device and to be communicated via a communication channel to a communication device of a second participant of the plurality of participants; wherein the program instructions cause the one or more processors to: identify a target accent to selectively modify the one or more words in the voice communications in the first accent to the target accent; modify one or more vocal features of the voice communication of the one or more words in the first accent to a corresponding one or more vocal features of the target accent; and communicate the voice communications comprising the modified one or more words via the communication channel to the communication device.

In some implementations, the program instructions further cause the one or more processors to select the target accent based on a context for the voice communications. In some implementations, the program instructions further cause the one or more processors to select the target accent based on a context and one of a second dialect or a second accent of voice communications of the second participant. In some implementations, the program instructions further cause the one or more processors to identify a target dialect to selectively modify the one or more words. In some implementations, the program instructions further cause the one or more processors to modify the voice communications comprising the one or more words in the first dialect to be one of pronounced in the target dialect or replaced with one or more words in the target dialect.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 1 is a block diagram illustrating an implementation of a network environment for use with the systems and methods discussed herein;

FIGS. 2A-2B are block diagrams illustrating an example embodiment of an accent and dialect modification system.

Figure 3:
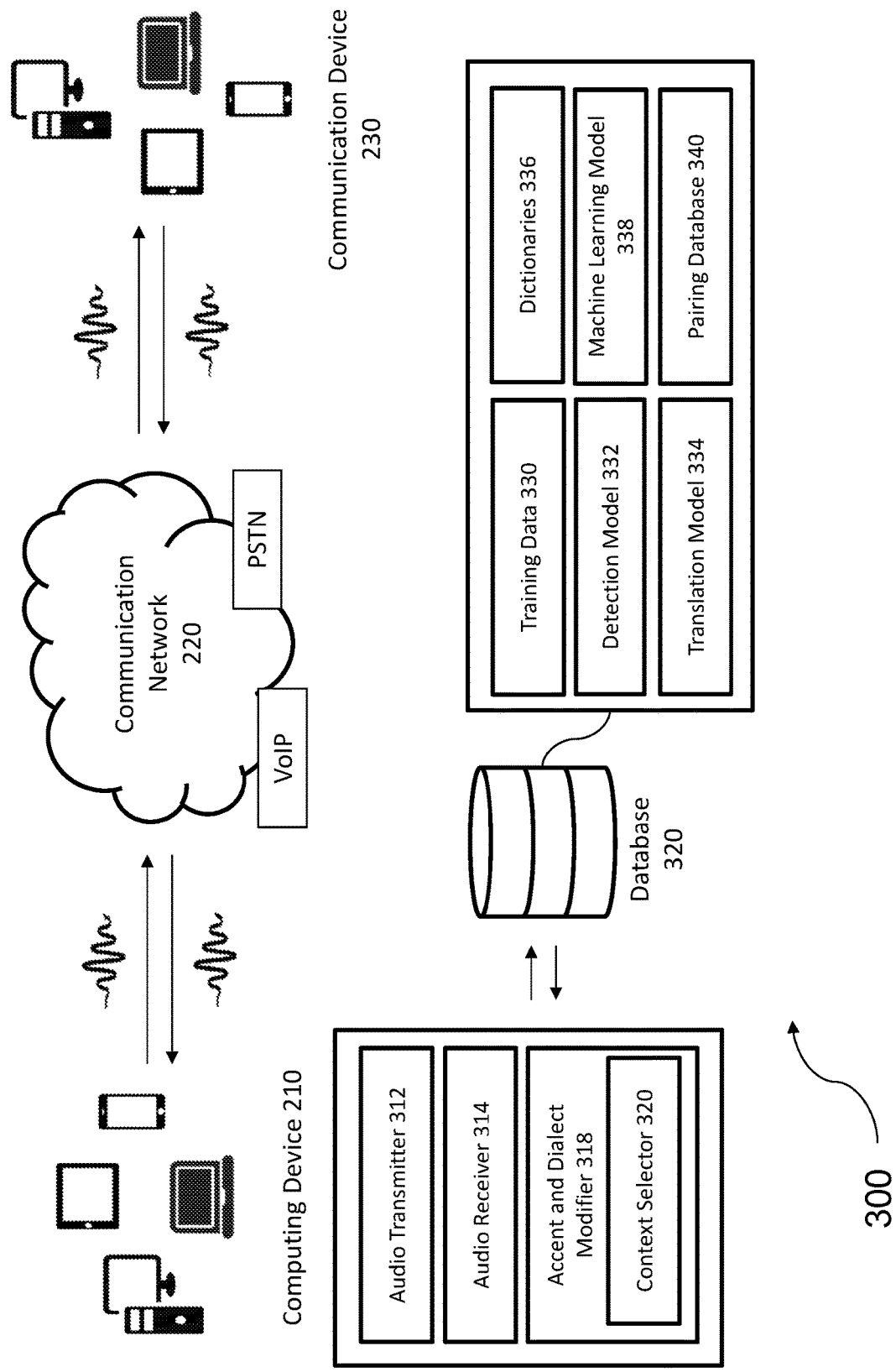
FIG. 3 is a block diagram illustrating an example embodiment of an accent and dialect modification system.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Prior to discussing the implementations and embodiments of the present solution, it is useful to briefly and general discuss a computing environment on which systems and methods of the present solution may be implemented, performed and/or executed. As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, such as the accent and dialect modifier 318 of the present solution, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Now referring to FIGS. 2A-8, details and implementation of the present solution will be discussed. In a general overview, the present disclosure is directed towards modifying an accent and/or dialect in real-time to sound more similar to an accent and/or dialect which would achieve a desired outcome. From an accent modification perspective, the accent may be a prescribed accent, such as received English being the optimal accent for closing a sale in a specific content (e.g. in angle-based sales companies). An optimal accent will most likely represent a prevalent accent with some minor modifications which would depend on the context of the desired outcome (e.g. audience or kind of call). For example, the audience and kind of call could be a sales call in Australia or a customer service call in the banking industry in Scotland.

In some implementations, modifying an accent in real-time uses an accent detection model, an accent translation model, and an optimal target accent model. An accent detection model can include a model for determining the accent of all sides of a call. In some implementations, modifying an accent in real-time uses an accent translation model. An accent translation model can include a model for determining what vocal characteristics need to be modified in order to achieve the sound of another accent. The accent translation model can be built by multiple speakers saying the same word in different accents multiple times. Each pairing of an accent can be an individual model (e.g. American to Scottish, Japanese to German), so there will be many accent translation models. The accent detection model can be used to determine which accent translation model needs to be loaded to make the modifications.

In some implementations, modifying an accent in real-time uses an optimal target accent model. An optimal target accent model can be trained on prior conversation data of people with differing accents in different contexts. In some implementations, a desired outcome is defined (e.g. a closing sale or a 5 out of 5 customer service rating) and accents in a call are labelled with whether they achieved the optimal desired outcome. With a large dataset of call conversations, a neural network machine learning model can detect a correlation between accent features and their success in achieving the optimal desired outcome in the specified context. In some implementations, the specified context could be a formal or a non-formal setting, an age group or a location context.

From the perspective of dialects, dialect modification can replace entire words. In some implementations, dialect modification uses components of accent modification with additional features. In some implementations, modifying a dialect in real-time uses a dialect detection model, a dialect translation model and dialect dictionary, and an optimal target dialect model. In some implementations, a dialect detection model can include a model for determining the dialect used by all participants in a call. In some implementations, a dialect translation model and dialect dictionary could include a model to transcribe a spoken word from speech-to-text, determine the equivalent word by referencing an uploaded dialect dictionary and modulate a voice in real-time to replace the spoken word with an entirely new word using a text-to-speech model. The dialect translation model would determine attributes of a user before the target word was spoken so that their voice profile can be replicated in the real time modification and the replaced word flows with the vocal biometric profile of the user. In some instances, replacing a word for another word is not grammatically accurate, for example, when translating between dialects, different words may belong in different sections of a sentence. In some implementations, modifying an entire sentence structure may cause a lag between receiving an audio signal and producing a new one. The lag could be too long for effective communication in real-time modification of a dialect. However, modifying an entire sentence structure can be useful in implementation in which lag may not be present or for training and modifications purposes.

In some implementations, modifying an accent in real-time could require an optimal target dialect model. The optimal target dialect model could include integrating the optimal dialect model into the accent model. An optimal target dialect model can be trained on prior conversation data of people with differing accents in different contexts. In some implementations, a desired outcome is defined (e.g. a closing sale or a 5 out of 5 customer service rating) and accents in a call are labelled with whether the call achieved the optimal desired outcome. With a large dataset of call conversations, a neural network machine learning model can detect a correlation between dialect features and their success in achieving the optimal desired outcome in the specified context. In some implementations, the specified context could be a formal or a non-formal setting, an age group or a location context.

Accent, in the context of this disclosure, is the way an identical word is pronounced, the word is retaining its spelling but could have multiple verbalizations. Dialect, in the context of this disclosure, is a change in spelling of a word belonging to the same language, or in some cases, a completely different word. For example, in German, the word for "speak" is "sprechen", but in the Swabian dialect, the word for "speak" is "schwaetzen."

For example, FIGS. 2A and 2B are block diagrams illustrating example embodiments of an accent and dialect modification system 202. In brief overview of FIGS. 2A and 2B, the accent and dialect modification system may include a first participant or user 200 on a first device 210 communicating via a communication channel with a second device 230 of a second participant or user 240 over a network 220, such as to facilitate or have an audio and/or video conversation between the first participant and the second participant. The user 200 can communicate with a participant 240 who is receiving a call via the participant's 240 communication device 230. The communication device 230 can be a computing device 210. The computing device 210 can send and receive communication signals (e.g. via voice over internet protocol (VoIP) or public switched telephone network (PSTN)). The computing device 210 can execute software implementing the accent and dialect modifier 318 (described further in FIG. 3). The accent and dialect modifier 318 can be software that can modify accents and/or dialects as described herein. The accent and dialect modification system 202 can include a communication network 220. A communication network 220 can be any type and form of network, including but not limited to an internet protocol (IP) based or a PSTN network. The communication network 220 can send and receive signals originating from computing device 210 and communication device 230, such as audio and/or video signals, for example VoIP communications.

Without modification by the accent and dialect modifier of the present solution, the participants 200, 240 communicate with each other over the communication channel using unmodulated audio signals of their voices in whatever accent and/or dialect such participants may communicate as illustrated in FIG. 2A. With modification by the accent and dialect modifier of the present solution, the participants 200, 240 communicate with each other over the communication channel using modulated audio signals of one or more of their voices in the accent and/or dialect selected and modified as described further herein and illustrated in FIG. 2B. In implementations, one of the participants such as user 200 will have his or her voice modified from a first accent and/or dialect to a second accent and/or dialect, such as to meet a desired outcome of the call based on the context of the call.

Any of the communications devices 210 and 230 can be any embodiments of device 101, described above in connection with FIG. 1, including but not limited to a laptop computer, a desktop computer, a tablet computer, a wearable computer, a smart phone, IP based phone, a conference call system or phone, a smart television, a video game console, a workstation, a server, a smart appliance, a cellular phone, a telephone, a virtual assistant device, or a computer within a vehicle. The communication devices 210 and 230 can be any device capable of sending and receiving audio and/or video signals, such as via VoIP or PSTN signals. The communication devices 210 and 230 may include any type and form of hardware and software for receiving, detecting or being provide voice or audio as input, such as via a microphone. The communication devices 210 and 230 may include any type and form of hardware and software for playing, outputting or providing voice or audio as output, such as via a speaker.

Further to FIG. 2A, FIG. 2A depicts a conversation held by user 200 and participant 240 whereby the accent and dialect modifier 318 may not modify the accent and/or dialect of the user 200. A user 200 has an accent and/or dialect represented by the unmodulated voice or signal waveform. The unmodulated voice or signal waveform can be received by communication device 210 and transmitted via the communication network 220 without modification. The unmodulated voice or waveform can be received by communication device 230 which can be communicated to, provided to or played to the participant 240. The participant 240 can be a single participant or multiple participants, for example, in a conference call. The communication device 230 can be a single device or multiple devices. The unmodulated voice or waveform is received by the communication device of participant 240. The participant 240 can cause, input or provide a voice or waveform of a different accent and/or dialect, or having other characteristics different from the voice or waveform of user 200, to the communication device 230. The voice or waveform of participant 240 can be transmitted via the communication network 220 to computing device 210 which can be communicated, provided or played to the user 200.

As illustrated in FIG. 2B, implementations of the present solution may modify the unmodulated voice of one or more of the participants to provide a modulated voice with a target accent and/or dialect. FIG. 2B depicts a conversation held by user 200 and participant 240 whereby the accent and dialect modifier 318 modifies the accent and/or dialect of the user 200. In the example shown in FIG. 2B, the accent and dialect modifier 318 modifies the voice of the user 200 into and accent and/or dialect desired or targeted for participant 240, such as to cause a certain outcome or result of the call or conversation, for example, based on the context of the call. In one example, the system modifies the voice of user 200 into an accent/dialect more familiar to call participant 240 (such as modifying the voice from an American accent to an Australian accent). A user 200 has an accent and/or dialect represented by the unmodulated voice or waveform. The unmodulated voice or waveform can be received by computing device 210. Before or during the transmission of the waveform to or prior to or at time of receipt by communication device 230 via network 220, the unmodulated voice or waveform undergoes modification by the accent and dialect modifier 318 to modify the accent and/or dialect. The modified waveform can be transmitted via the communication network 220. The modulated voice or waveform can be received by communication device 230 which can then be communicated to, provided to or played to the participant

240. The participant 240 can be a single participant or multiple participants, for example, in a conference call. The communication device 230 can be a single device or multiple devices. The modulated voice or waveform is received by the participant 240. The participant 240 can communicate, input or provide a voice or waveform of a same or different accent and/or dialect to the communication device 230. The voice or waveform can be transmitted via the communication network 220. The voice or waveform of participant 240 can be received by computing device 210 which can then be communicated, provided or player to the user 200. In some implementations, the system can modify the participant's 240 voice or waveform transmitted to the user 200. In some implementations, the system can transmit a modified waveform of the user 200 that adapts to the participant's 240 changing environment or accent and/or dialect.

FIG. 3 is a block diagram illustrating an example embodiment of an accent and dialect modification system 300. In brief overview, the accent and dialect modification system 300 can include a computing device 210, a communication network 220, a communication device 230 and a database 320. In some implementations, the system 300 includes multiple computing devices 210 and communication devices 230 on different networks. The computing device 210 may include an audio transmitter 312 and audio receiver 314 for sending and receiving voice and/or audio signals via network 220, such as from communication device 230. Computing device 210 may include the accent and dialect modifier 318 for modifying the voice and/or audio signals of computing device to a targeted or selected accent and/or dialect. Likewise, the computing device 210 will include an audio transmitter and audio receiver and in some implementations, the accent and dialect modifier 318. The accent and dialect modifier may interface to, communicate with or integrate with a database 320 to obtain data and instructions and accent and/or dialect models for performing the accent and/or dialect modifications. The database includes training data 330, detection model 332, translation model 334, dictionaries 336, machine learning model 338, pairing database 340 and context selector 320.

In some implementations, the computing device 210 can include an audio transmitter 312 and audio receiver 314 for sending and receiving audio-based communications. The audio transmitter 312 can comprise any combination of hardware and software for communicating, sending or transmitting signals comprising audio content in any type or form. The audio transmitter 312 can transmit audio signals with audio content using any type and form of protocol, such as VoIP based communications. The audio transmitter 312 can be connected directly or indirectly, by wire or wirelessly to the communication network 220. The audio transmitter 312 can transmit signals, for example, wirelessly through WiFi or through Bluetooth. The audio transmitter 312 can be implemented and configured to transmit packets over a network that carry audio content as a payload, such as in any of the waveforms of FIGS. 2A-2B.

The audio receiver 314 can comprise any combination of hardware and software for receiving signals comprising audio content in any type or form. The audio receiver 314 can receive audio signals with audio content using any type and form of protocol, such as VoIP based communications. The audio receiver 314 can be connected directly or indirectly, by wire or wirelessly to the communication network 220. The audio receiver 314 can receive signals, for example, wirelessly through WiFi or through Bluetooth. The audio receiver 314 can be implemented and configured to receive and process packets over a network that carry audio content as a payload, such as in any of the waveforms of FIGS. 2A-2B.

The accent and dialect modifier 318 can include an application, program, software, scripts, libraries, tasks, services, processors or any type and form of instructions executable on a device, such as for executing accent and dialect detection and modification. In some embodiments, the accent and dialect modifier 318 can be implemented and configured with logic, functionality, rules or instructions for modifying accent and/or dialect in accordance with any of the operations described herein. In some aspects, the accent and dialect modifier 318 may be an accent modified without dialect modification and generally referred to as an accent modifier. In some aspects, the accent and dialect modifier 318 (may be a dialect modifier without accent modification and generally referred to as a dialect modifier. In some embodiments, the accent and dialect modifier 318 (or the accent modifier or dialect modifier as the case may be) carries out any step, function or operation on its own and automatically without user intervention for that step, function or operation.

In some implementations, the accent and dialect modifier 318 can be implemented and/or installed and executed on the devices 210 and/or 230. In some embodiments, the accent and dialect modifier may be stored, installed and executed on a device remote from the devices 210, 230, such as being stored and executed on a server, cloud server, a dedicated server or a remote desktop. In some implementations, the accent and dialect modifier 318 is stored remotely from device 210, 230 and downloaded, installed and executed from the remote device to the local device 210, 230. In some implementations, the accent and dialect modifier 318 is implemented and executed on a network device intermediary to the devices 210, 230 such as on a gateway or proxy device.

The accent and dialect modifier 318 may access and use the database 320 which may be stored locally on the same device as the accent and dialect modifier 318 or stored and accessed over a network on a second device remote to the device of the accent and dialect modifier 318. In some implementations, the database 320 can be any type and form of database, relational, object based or otherwise on a server, cloud server, a dedicated server, a remote desktop, or a local computer. In some implementations, the database 320 can comprise multiple databases. The database 320 can be distributed geographically or across multiple database platforms. In some embodiments, the database 320 may comprise a plurality of documents, scripts or files having the information and content described herein. In some embodiments, the accent and dialect modifier 318 may obtain updates or changes to the database from another device. In some embodiments, the accent and dialect modifier 318 may cache a copy of the database. In some embodiments, the accent and dialect modifier 318 use the cache or current copy of the database if the accent and dialect modifier 318 does not have access or cannot access a copy or updates of the database from a remote device.

The accent and dialect modifier 318 may be designed, configured and/or implemented to provide accent and/or dialect modifications to voice or audio signals, such as those described in FIGS. 2A and 2B. The accent and dialect modifier 318 can receive, retrieve, accept, or intercept data packets from a computing device 210 or a communication device 230. In some embodiments, the data packets can include data representing or containing audio of conversation(s), such as audio fragments. The accent and dialect modifier 318 can receive, retrieve, accept, or intercept one or more data packets at a time, such as in real-time, and inspect or analyze the data packet(s) to determine a plurality of features, such as via using the database 320. Processing the data packets can include identifying the context of the conversation through meta tags of the data packets. Processing the data packets can include determining which detection model 332, translation model 334, dictionaries 336, machine learning model 338, and pairing database 340 to use and applying the same for modification of the audio signal or content.

For example, the accent and dialect modifier 318 can receive a data packet and identify that the data packet has a first accent and a first dialect. Based, on information about the context 402, the accent and dialect modifier 318 can access the pairing database 340 to select or determine an optimal accent and/or dialect to convert none, some or all of the audio content of the data packet to the selected accent and/or dialect. For example, the accent and dialect modifier 318 can retrieve the detection model 332 to identify that the data packet has a first accent and/or first dialect. For example, the accent and dialect modifier 318 can determine that the first accent and first dialect of a user 200 is the optimal pairing for a conversation with a participant 240. In some embodiments, the accent and dialect modifier 318 can determine that the entire audio content of data packet including a conversation, a conversation fragment, a sentence or a single word should be modified. In some embodiments, the accent and dialect modifier 318 can determine that certain data portions of the audio content of data packet including a conversation, a conversation fragment, a sentence or a single word should be modified.

In some embodiments, the accent and dialect modifier 318 records and stores the unmodified conversation of or between participants, the modified conversation of or between participants and/or information about the context, outcome or rating of the call. The accent and dialect modifier 318 may use these conversations and information as additional training data 330 to input into the machine learning model 338 and update the pairing database 340. For example, this may allow the accent and dialect modifier 318 to provide real-time improvements to the model perform a more customized modification.

The accent and dialect modifier 318 can receive, retrieve, accept, or intercept one data packet and process the data packet before processing the next data packet. The accent and dialect modifier 318 can process a plurality of data packets and store the processed data packet in memory or a buffer for transmission. The accent and dialect modifier 318 can transmit the modified data packet or packets in real-time, in a continuous stream, at a constant time interval or at a variable time interval. In some embodiments, the accent and dialect modifier 318 can transmit the modified data packet or packets to account for lag or to provide better experience in the conversation by having a group of data packets with the modified audio content be buffered and transmitted at a targeted time or preferred time. In some embodiments, the accent and dialect modifier 318 buffers a string of data packets and transmits the data packets once the accent and dialect modifier 318 has determined that an accent and/or dialect modification can contribute to achieving a desired goal or outcome. In some embodiments, the accent and dialect modifier 318 can skip modifying data packets which the accent and dialect modifier 318 identifies as unnecessary to modify for the desired or targeted outcome or for the effective use of the selected accent and/or dialect.

The accent and dialect modifier 318 may modify the accent and/or dialect of a conversation, or portions thereof, on any level of granularity, including but not limited on a per sound basis, per word basis, set or string of words basis, on a whole or portion of a sentence structure basis. In some embodiments, the accent and dialect modifier 318 modifies the accent and/or dialect of a per sound basis. In some embodiments, the accent and dialect modifier 318 modifies the accent and/or dialect of a conversation on a per word basis. In some embodiments, the accent and dialect modifier 318 modifies the accent and/or dialect of a conversation on a per set of words or portions of sentence basis. In some embodiments, the accent and dialect modifier 318 modifies the accent and/or dialect of a conversation on a per sentence basis. In some embodiments, the accent and dialect modifier 318 modifies the language of a conversation. In some embodiments, the accent and dialect modifier 318 modifies the accent of a selected one or more sounds, words or sentences or other portions of the conversations. In some embodiments, the accent and dialect modifier 318 modifies the dialect of a selected one or more sounds, words or sentences or other portions of the conversations. In some embodiments, the accent and dialect modifier 318 modifies both the dialect and accent of a selected one or more sounds, words or sentences or other portions of the conversations. In some embodiments, the accent and dialect modifier 318 modifies any voice characteristics such as pitch, tone, volume, etc. in connection with or associated with any modifications of the accent and/or dialect.

In some embodiments, the accent and dialect modifier 318 modifies the accent and/or dialect of a conversation from any one or more dialects and/or accents to any other one or more dialects and/or accents, which may be the same or different than any of the participants in the conversation. For the same conversation, the accent and dialect modifier 318 may modify the accent and/or dialect of a participant using multiple different accents and/or multiple different dialects over the course of or otherwise during the conversation. For the same participant, the accent and dialect modifier 318 may modify the accent and/or dialect of the participant using different accents and/or dialects over the course of multiple different conversations or different contexts.

For example, there may be a conversation between a first participant with a first dialect and a first accent with a second participant with a second dialect and a second accent for a context. The accent and dialect modifier 318 may modify the first dialect of the first participant for portions of the conversation to a third dialect. The accent and dialect modifier 318 may modify the first accent of the first participant for portions of the conversation to a third accent. The accent and dialect modifier 318 may modify the first dialect and first accent of the first participant for portions of the conversation to a third dialect and third accent. The accent and dialect modifier 318 may modify the first dialect of the first participant for portions of the conversation to a third dialect and fourth accent. The accent and dialect modifier 318 may modify the first dialect of the first participant for portions of the conversation to a fourth dialect and a third accent. The accent and dialect modifier 318 may modify the first dialect of the first participant for portions of the conversation to a second dialect of the second participant with a third accent. The accent and dialect modifier 318 may modify the first dialect and first accent of the first participant for portions of a conversation to a second dialect of the second participant with a third accent. The accent and dialect modifier 318 may modify the first accent and first dialect of the first participant for portions of a conversation to a second accent of the second participant with a third dialect.

In some implementations, a context selector 320 can identify, assign or select the context to the call, situation or conversations. For example, the context selector 320 can be part of an interface (e.g., graphical user interface, command line or application programming interface (API)) to the accent and dialect modifier by which a user selects a context from multiple contexts. In another example, a user who makes different calls under different contexts may be able to select a context for each call from a list or menu of available contexts. In some implementations, an administrative user selects the context for the configuration of the accent and dialect modifier. In some implementations, the context selector accesses the database to identify a list of available contexts to user or choose from. In some implementations, the context selector 320 selects the context without any user input at the context selection step, such as in an automated fashion based on configuration of the system, detection of meta-data related to call or conversation, detection of words in audio during conversation, identification of phone numbers, contact information or other attributes of the participants.

The accent and dialect modifier 318 can use, incorporate, integrate, communicate or access the database for configuration, implementation and execution of any of the accent and dialect modifier's logic, steps, functions or operations. The database 320 can include training data 330, a detection model 332, a translation model 334, dictionaries 336, a machine learning model 338, and a pairing database 340.

In some implementations, training data 330 includes data of, from or derived from recordings of multiple speakers pronouncing the same utterances. The same utterances can include multi-word sentence fragments in different accents and/or dialects. In some embodiments, the training data 330 can include conversation fragments. The conversation fragments can include conversation fragments in different languages. In some embodiments, the training data 330 can include the age of the participant or speaker. The training data can include tuple values for a conversation fragment and a tag related to a success value in achieving a certain goal. In some embodiments, the training data 330 can include a training dataset. The training data set can include a set of examples used to fit the parameters of the machine learning model 340. The machine learning model 340 can be trained on the training dataset using a supervised learning method. The training dataset can consist of a pair of input vector and the corresponding output vector or label. The machine learning model 340 is run with the training dataset which is then compared with the label. Based on the result of the comparison and the specific learning algorithm, the parameters of the machine learning model 340 can be adjusted, thus producing a fitted model. The fitted model is used to predict the responses for the observations in a second dataset called the validation dataset. The validation dataset can provide an unbiased evaluation of a machine learning model fit on the training dataset while tuning the machine learning model's hyperparameters. A test dataset can be used to provide an unbiased evaluation of a final model fit on the training dataset. The training final model fit on the training data 330 can be used to produce a pairing database 340 connecting the conversation fragments with an appropriate label.

In some embodiments, the training data 330 can include context 402, rating 404, conversations 406, and dialect and accent labels 408. In some implementations, the training data 330 is generated by user selection criteria and fed to the machine learning model 338. In some implementations, the training data 330 is tagged with information used to identify relevant characteristics, such as context 402, success rating 404, and dialect and accent labels 408 of various conversations 406. In some implementations, the training data is the output of a machine learning model 338.

In some implementations, a detection model 332 can include a model configured to determine an accent or dialect of a call participant 240. For example, the detection model 332 can accept or intercept packets over an internet protocol containing voice information of a call participant 240. The detection model 332 can process the entire conversation, a sentence or a word contained within a packet or multiple packets to detect the accent and/or dialect of the call participant 240. In some implementations, the detection model can use voice recognition software to detect the accent and/or dialect of a call participant 240. In some implementations, it can detect the accent and/or dialect of a call participant 240 by accessing historical conversations stored in a database 320. In some implementations, the detection model 332 can detect the language, accent and/or dialect of a call participant using a look-up table to a dictionary 336. In some implementations, the user 200 can bypass using a detection model 332 by selecting the dialect or accent of the call participant 240 to whom the user is speaking. The detection model 332 can be integrated with the accent and dialect modifier 318 being executed on the computing device 210. In some implementations, the detection model 332 can detect a dialect or accent automatically without executing a dialect recognition model by using meta-tags, or customer-relationship management (CRM) data. In some implementations, the dialect detection model 332 can output an accent or dialect probability, for example, by matching the biometric characteristics of different accents and/or dialect on a spectrogram.

In some implementations, a translation model 334 can be trained with data of multiple speakers pronouncing the same words or phrases in the same language. For example, prior data of multiple speakers pronouncing the same words or phrases in the same language in slightly different ways would allow the translation model 334 to capture the variation in accent of a particular word or phrase. The translation model 334 can use a dictionary 336 to build a model that includes translations between a first language and a second language given a particular context. In some implementations, a translation model 334 can be trained with training data 330. In some implementations, a translation model 334 can include the output of a machine learning model 338. In some implementations, a translation model 334 can include influence by various dictionaries 336. For example, a translation model 334 can take into account prescribed accents or vocal features of a range of accents. In another example, a translation model 334 can take into account unusual or minor spoken accents or dialects which may sound similar to the prevalent accent or dialect of a region, with borrowed minor modifications to a small selection of words. A translation model 334 can resemble a mash up between, for example, English received pronunciation with the American way of emphasizing certain words, e.g., in a sales context the English received pronunciation may be recognized as being more persuasive or trustworthy, but American clients may understand familiar American words, such as brand names, more easily in their native American accent compared to with an English accent.

In some implementations, dictionaries 336 can be used to replace a word with another word, such as in the implementation of dialect modification. The dictionary may comprise a lookup table or mapping to identify a replacement word of one language, dialect and/or accent for a word of another language, dialect and/or accent. In scenarios of higher complexity, such as when an accent modification is not sufficient, but rather an entire word must be replaced to achieve a certain meaning, dictionaries 336 could be accessed by the computing device 210 through the accent and dialect modifier 318. In some implementations, the dictionaries 336 can be referenced by a speech to text translation model. In some implementations, the dictionaries 336 can be compiled of existing linguistic databases. In some implementations, the dictionaries can be influenced by the detection model 332 and translation models 334.

In some implementations, a machine learning model 338 can be any type and form of machine learning or results from the same, such as a supervised machine learning model 338. The machine learning model 338 can extract vocal features of pronounced utterances. The machine learning model 338 can compare quantified values of the vocal features across multiple dialects. In some implementations, the machine learning model 338 can be trained on input and output pairs of prior conversations and their associated labels of how well they achieved a desired outcome. In some implementations, prior conversations can be retrieved from archives of calls between people with a range of dialects. The output of a machine learning model 338 can be a pairing database 340. The input of a machine learning model 338 can be training data 330. The machine learning model 338 can be a binary classification model, a multiclass classification model or a regression model. The machine learning model 338 can include, for example, a linear regression model, a logistic regression model, a linear discriminant analysis model, a naïve Bayes model, a K-nearest neighbor model, a learning vector quantization model, a support vector machine model, or a random forest model.

In some implementations, a pairing database 340 can pair conversations or conversation samples to their associated labels. In some implementations, conversation samples are inputted into a machine learning model 338, along with labels of received dialects at the other end of the conversation and the success or rating of the conversation in achieving a particular goal. For example, an example of a goal could be closing a sale or a high customer satisfaction rating. In some implementations, the machine learning model 338 can determine, by matching inputs and labels, a correlation between the success (label) and dialect combination (input) to output a probability of how likely a dialect combination will result in success (label).

Figure 4:
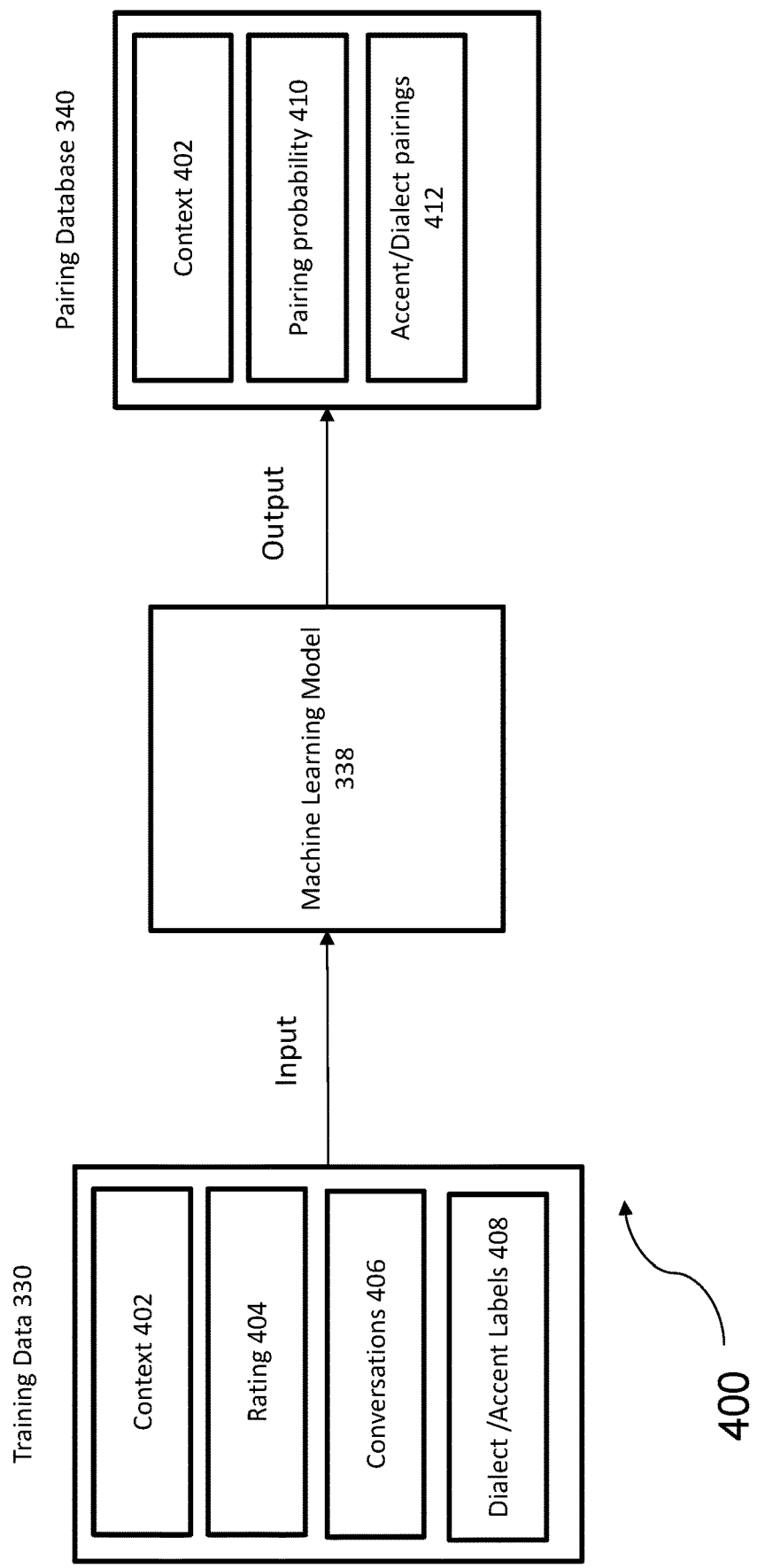
FIG. 4 is a block diagram illustrating an example embodiment of a machine learning engine to generate a pairing database.

FIG. 4 is a block diagram illustrating an example embodiment of a machine learning system 400 to generate a pairing database. The machine learning system 400 can include training data 330, a machine learning model 338, and a pairing database 340. In some implementations, the training data 330 is input for the machine learning model 338. In some implementations, the output of the machine learning model 338 is a pairing database 340.

In some implementations, training data 330 can include context 402, rating 404, conversations 406, and dialect/accent labels 408. The machine learning model 338 can use as inputs, all or a subset of the training data 330. The training data can be obtained from the outputs of a machine learning model 338. In some implementations, training data 330 includes prior data of multiple speakers pronouncing the same utterances. The same utterances can include multi-word sentence fragments in different accents or dialects. The training data 330 can be stored in the database 320. In some implementations, the training data 330 is generated by user selection criteria and fed to the machine learning model 338. In some implementations, the training data 330 is tagged with information used to identify relevant characteristics, such as context 402, success rating 404, and dialect and accent labels 408 of various conversations 406.

In some implementations, the context 402 is the circumstance, purpose, situation and/or setting for the conversation or communications between the participants on the audio or video call. The context can include the domain or industry associated with one or any of the participants. The context can include the age or ages associated with one or any of the participants. The context can include the gender associated with one or any participants. The context can include any user attributes of one or any participants. The context can include the nationality of one or any of the participants. The context can include the ethnicity of one or any of the participants. The context can include the job, title or responsibilities associated with one or any of the participants. The context can include the name or identity of the company or companies associated with one or any of the participants. The context can include the name or identity of the industry or industries associated with one or any of the participants. For example, someone in a particular industry can be correlated with additional demographic traits that influence communication (e.g. educational background or professional identity). The context can include the geography, such as zip code, city, state, region or country, associated with one or any of the participants. The context can include a purpose of the call, such as to sell a product or service, conduct an interview, conduct a review, receive user feedback or comments on a product or service or experience, conduct a survey, inform or educate a participant, resolve an issue or address a problem. In some implementations, the context 402 can include a type of call (e.g. a sales call, a service call or a support call). In some implementations, the context 402 can include a desired outcome for the call, such as to get an order, close a sale, resolve an issue, complete a survey, interview or evaluation. In some implementations, the context 402 can include a desired outcome for the call, such as a satisfaction or level of service or customer experience according to any type and form of metric or rating. The context 402 can include a selected outcome for voice communications. In some implementations, the context 402 is an output of the machine learning model 338 based on any inputs to the model.

In some implementations, a rating 404 can include any type and form of rating or ranking of a call or conversation, such as for example customer satisfaction ratings. The rating or ranking of the call or the conversation may be assigned or provided for a particular context. The rating or ranking can be numerical on any range or scale. The rating or ranking can be qualitative based on a selection from one or more groups of descriptive outcomes in text or string form. The training data 330 could include a rating for each conversation and the associated dialects or accents used. In some implementations, the rating 404 is an output of the machine learning model 338. For example, a rating can be how well a conversation went towards achieving a desired goal (e.g., closing a sale) or a customer satisfaction rating. A customer satisfaction rating can be on a numeric scale, such as between 1 to 5 where a high numeric value is a successful call and a low numeric value is an unsuccessful call.

In some implementations, conversations 406 can include conversations held between a participant or user 200 and a participant 240. Conversations 406 can be stored in any format suitable for storing audio content, for example, to allow a convenient playback option. Conversations 406 can be stored or translated to text form with pronunciation annotations, for example, to conserve memory. In some implementations, conversations 406 can include a fragment of a sentence. Conversations 406 can include multi-word sentence fragments in different accents or dialects. In some implementations, conversations 406 can include multiple participants, for example, in a conference call. In some implementations, conversations 406 can include conversations that have been optimized by the machine learning model 338. In some implementations, conversations 406 are retrieved from archives, logs or data sources of calls between people with a range of dialects and/or accents.

In some implementations, dialect and accent labels 408 can be an input to the machine learning model 338. The dialect and accent labels 408 can be dialect and accent tags of conversations 406. In some implementations, the dialect and accent labels 408 are amplitudes or intonations at certain points of an utterance. For example, a word can have a numeric value assigned to each syllable, the numeric value differing across different accents or dialects. In some implementations, the dialect and accent labels 408 include the success value of a achieving a desired outcome. In some implementations, the dialect and accent labels 408 are based on the context 402. For example, the dialect and accent label could be a closing sale in the banking industry customer satisfaction ratings in the insurance industry, or a trustworthiness or friendliness rating.

The output of the machine learning model 338 can be a pairing database 340. The pairing database 340 can include context 402, pairing probability 410 and dialect pairings 412. The pairing database 340 can include a probability of how likely an accent and/or dialect combination will result in a success. The pairing database may identify a desired, targeted or optimal accent and/or dialect to use for a call or conversation between participants having certain accents and/or dialects. The pairing database may identify a desired, targeted or optimal accent and/or dialect to use for a call or conversation between participants having certain accents and/or dialects for that context. The pairing database may identify a plurality desired, targeted or optimal accents and/or dialects to use for a call or conversation between participants having certain accents and/or dialects for that context and each with a probability of success for an outcome of the call or a probability the call will leads to a predetermined result or outcome. In some embodiments, multiple pairing databases 340 could be the output of different machine learning models 388. For example, each pairing database 340 can have a separate success probability based on the particular models used to obtain the pairing databases 340. For example, a test set could be used on each pairing database 340 for the given context because some pairing databases 340 and their associated pairing probabilities may be more accurate with different test sets and input accents.

In some implementations, the pairing database can include a context 402. The context 402 can include the contexts associated with the database pairings, for example, given a first context, it follows that a particular pairing from the pairing database should be selected. The context 402 can include the contexts as described in a previous section of the disclosure. The context 402 can be an output of a machine learning model 338.

In some implementations, the pairing database can include a pairing probability 410. The probability may be a percentage or a value of a scale that indicates a likelihood of success, or relative likelihood or probability, of achieving a desired outcome or result in the situation or context. A pairing probability 410 can include the probability that a particular accent will lead to a particular outcome. A pairing probability 410 can include the probability that a particular dialect will lead to a particular outcome. A pairing probability 410 can include the probability that a particular combination of accents and dialects will lead to a particular outcome in a certain situation with a given context 402.

In some implementations, the pairing database can include an accent and/or dialect pairing 412. A dialect pairing 412 can include a dialect option in combination with a situation or for a context. In some embodiments, a dialect pairing can exist for a particular conversation, sentence or word. An accent pairing 412 can include an accent option in combination with a situation. In some embodiments, an accent pairing can exist for a particular conversation, sentence or word. An accent a dialect pairing 412 can include an accent and dialect option in combination with a situation or for a context. In some embodiments, an accent and dialect pairing can exist for a particular conversation, sentence or word. In some embodiments, a conversation 406 can have different accent and/or dialect pairings 412. In some embodiments, a conversation 406 can have the same accent and/or dialect pairings 412. In some embodiments, the dialect pairings 412 can be modified by accent options. In some embodiments, the accent pairings 412 can be modified by dialect options.

Figure 5:
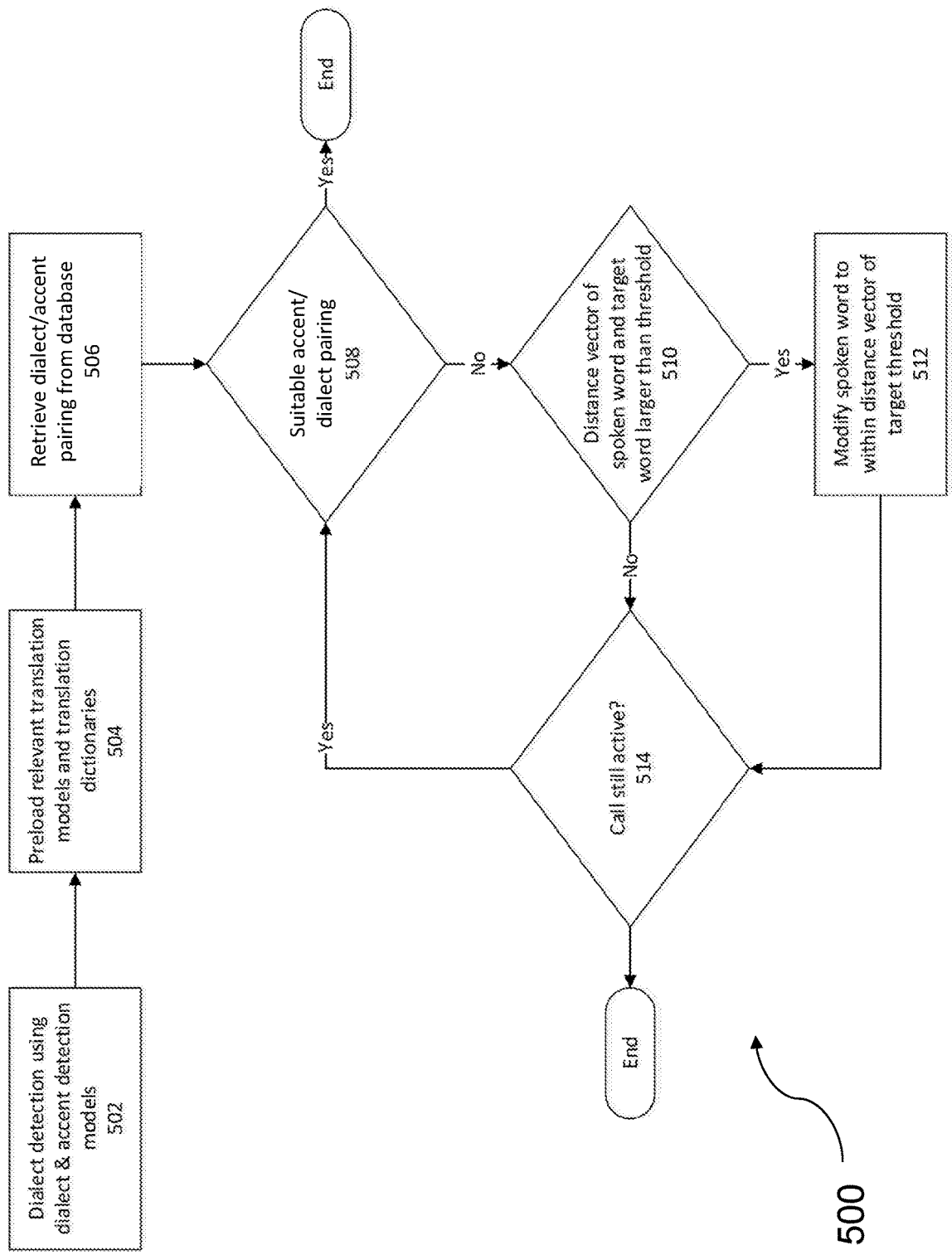
FIG. 5 is a flow diagram illustrating an example embodiment of a method for modifying an accent or dialect into another accent or dialect.

FIG. 5 is a flow diagram illustrating an example embodiment of a method for modifying an accent and/or dialect into another accent and/or dialect 500. In brief overview, the method can include dialect detection using dialect and accent detection models 502, preloading relevant translation models and translation dictionaries 504, retrieving an dialect and accent pairing from a database 506, determining if the dialect and/or accent pairing is optimal 508, determining if the distance vector of the spoken word and the target word is larger than a threshold 510, determining if the call is still active 514, and modifying a spoken word to within a distance vector of the target threshold 512.

In further details of step 502, the accent and dialect modifier detects a dialect and/or accent using a dialect and accent detection model. The accent and dialect modifier can detect a dialect and/or accent by processing a plurality of data packets carrying audio signals of conversations. The accent and dialect modifier can process the data packets carrying the audio signals of conversations at any point during the conversation. In some embodiments, the accent and dialect modifier can identify, determine or extract certain vocal features from the audio signals or audio content to determine a dialect and/or accent of the speaker. The accent and dialect modifier can use any one or more dialect and/or accent models to compare and match the vocal features to identify the dialect and/or accent from the model. In some implementations, the dialect detection model 332 can output an accent or dialect probability, for example, by matching the biometric characteristics of different accents and/or dialect on a spectrogram. For example, the dialect and/or accent models may take as input one or more vocal features and provide as output one or more likely dialects and/or accents, such as based on a probability or likelihood score or threshold. In some embodiments, the accent and dialect modifier may query the database using the vocal features to determine the dialect and/or accent and/or the corresponding models. In some embodiments, a user 200 can select the accent or dialect that the participant 240 is speaking with and manually input the accent and dialect of the participant caller 240. In some embodiments, the accent and dialect can be detected automatically without executing a dialect recognition model by using meta-tags, or obtaining the information from a customer-relationship management (CRM) that identifies the same.

At step 504, the accent and dialect modifier preloads relevant translation models and translation dictionaries. For example, the relevant translation models and translation dictionaries can be installed on a local machine, such as computing device 210, 230, which may store the components retrieved from a server, such as from a cloud-based server or device. One benefit of retrieving the components from a cloud device is that the software application installed on a local machine can be much smaller and less memory intensive. A software application installed on a local machine can be easily accessible to a local device such as a mobile device or a less powerful computing device. One benefit of having the components located on a local machine installed with the software application of the accent and dialect modifier is decreasing latency and saving bandwidth (for example, bandwidth would be required to upload information between a computing device and a cloud server to load components and required models). In some embodiments, the accent and dialect modifier can query or request from the database the relevant translation models and dictionaries. In some embodiments, the accent and dialect modifier loads relevant translation models and dictionaries by downloading the relevant translation models and dictionaries onto storage on the computing device. In some embodiments, the accent and dialect modifier loads relevant translation models and dictionaries by downloading the relevant translation models and dictionaries into memory on the computing device. In some embodiments, the accent and dialect modifier identifies relevant translation models and dictionaries based on the content and/or language, accent and/or dialect the accent and dialect modifier is to use or operate. In some embodiments, the accent and dialect modifier loads relevant translation models and dictionaries prior to, at the beginning of a conversation or during the conversation.

At step 506, the accent and dialect modifier identifies, obtains or retrieves a dialect and/or accent pairing, such an optimal pairing, from the database, computing storage or computing memory. In some embodiments, the accent and dialect modifier selects and loads the dialect and/or accent pairing from storage or memory. In some embodiments, the accent and dialect modifier selects and loads the dialect and/or accent pairing from the database. In some embodiments, although may be referred to as an optimal dialect and accent pairing, the pairing may be a targeted, desired or predetermined pairing, and in some cases, can be a suboptimal dialect and accent pairing. In some embodiments, the accent and dialect modifier identifies, obtains or retrieves a dialect and/or accent pairing based at least on the context. In some embodiments, the accent and dialect modifier identifies, obtains or retrieves a dialect and/or accent pairing based at the accent and/or dialect of one or more of the participants. In some embodiments, the accent and dialect modifier identifies, obtains or retrieves a dialect and/or accent pairing based at the accent and/or dialect of both or all of the participants. In some embodiments, an optimal accent and/or dialect pairing may not be determined or be available based on the situation, the context and/or any of the accent and/or dialect of one, both or all of the participants At step 508, the accent and dialect modifier identifies whether a suitable or sufficient accent and dialect pairing is available or selected. In some embodiments, a pairing is sufficient if the accent and dialect strength of the user is within a predetermined threshold of the target accent and dialect defined by a model. In some embodiments, an algorithm will measure each individual word in the conversation to determine which words to modify. In some embodiments, if an optimal accent and dialect pairing is not identified, then the method proceeds to identifying whether the distance vector of a spoken word and target word is larger than a threshold 510. In some embodiments, the accent and dialect modifier identifies a plurality of accent and dialect pairings and selects the one with the highest associated value corresponding to likelihood of achieving a particular goal. The accent and dialect modifier may select a suboptimal accent and dialect pairing in some embodiments. In other embodiments, the accent and dialect modifier may select or use a default dialect/accent pairing if an optimal accent/dialect pairing is not available or otherwise selectable in time for use for or during the conversation.

At step 510, the accent and dialect modifier identifies whether the distance vector of a spoken word and target word is larger than a threshold 510. In some embodiments, each expressed word is measured by a model. In some embodiments, each expressed word is quantified by a model and the output to the model is compared against the optimal accent and dialect pairing model. For example, if the expressed word is equal to or within the strength threshold of the optimal target pairing model, then an algorithm can perform a check to determine if the call is still active 514. In some embodiments, the accent and dialect modifier queries the database or the model to identify whether the distance vector of a spoken word and a target word is larger than a threshold. In some embodiments, the threshold can be an administrator defined value, a value defined by the user or a preselected value. In some embodiments, the threshold value can change during the course of a conversation or for particular data packets. Limiting the modification to occur in circumstances outside of a threshold can lead to less consumption of processing capacity and voice synthesizing in cases where it is not always necessary to modify the dialect and/or accent. The threshold could represent a value of a person's limitation in accent perception. For example, where a person cannot perceive the difference in accent, the modification may not need to be made. The threshold could also be determined by the pairing probability 410, where the distance vector between spoken words has a marginal probability value of changing the outcome.

At step 514, the accent and dialect modifier identifies whether the call is still active. In some embodiments, the accent and dialect modifier sends a signal through the communication network to query whether the call participant is still actively connected to the network. In some embodiments, the accent and dialect modifier determines via any of the applications, programs, services or tasks providing the connectivity or the call between participants whether the call is active. In some embodiments, if the call is not active or the call is inactive, the call will proceed in terminating. In some embodiments, if the call is still active, then the call will proceed to identifying a next word or phrase to be identified.

At step 512, the accent and dialect modifier modifies a spoken word to within a distance vector of the target threshold. In some embodiments, the model 500 determines that an expressed individual word does not reach the target dialect strength and then can modify the expressed word to within the desired dialect and accent strength threshold determined by the dialect and accent pairing database. In some embodiments, the conversation can be broadcast on a lag of which the duration must be long enough for a word to be expressed and analyzed for its accent and dialect strength and then modified to be expressed by the modification software. For example, the lag duration can be a duration that sounds like real-time to a user (e.g. 100*ms*). In some embodiments, the accent and dialect modifier can send a packet of information to the database which contains instructions to modify a spoken word to within a distance vector of the target threshold.

Figure 6:
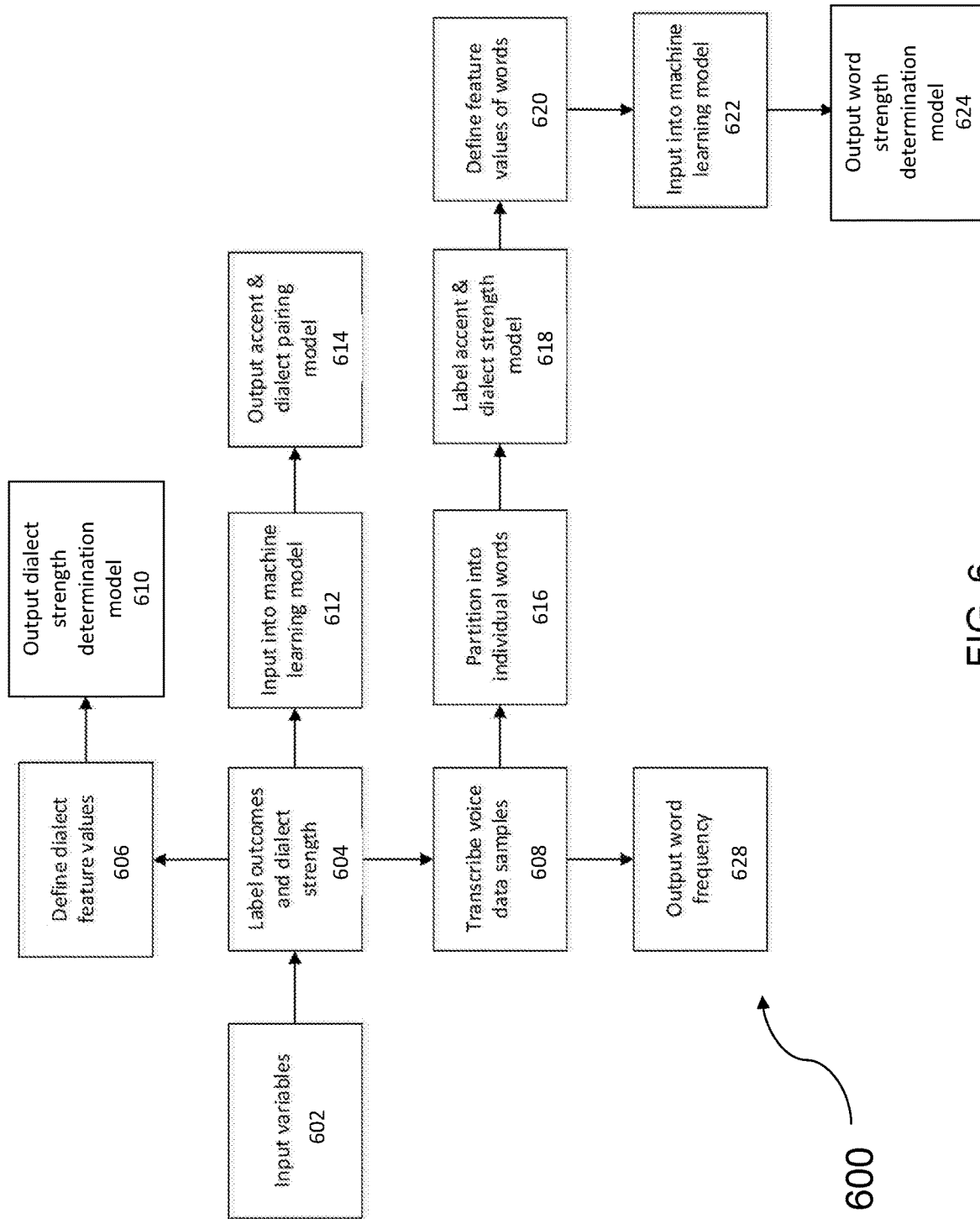
FIG. 6 is a flow diagram illustrating an example embodiment of a runtime determination of an optimal accent and dialect pairing.

FIG. 6 is a flow diagram illustrating an example embodiment of a determination of an optimal accent and dialect pairing 600. In brief overview, the method 600 can comprise inputting variables 602, labeling outcomes and dialect strength 604, defining dialect feature values 606, outputting dialect strength determination model 610, inputting outcomes and dialect strength into a machine learning model 612, outputting accent and dialect pairing model 614, transcribing voice data samples 608, partitioning voice data samples into individual words 616, labelling accent and dialect strength model 618, defining feature values of words 620, inputting feature values of words into a machine learning model 622, outputting a word strength determination model 624, and outputting word frequency 628. Although FIG. 6 may be described in connection with the accent and dialect modifier, any type of tool, software, application, program or set of executable instructions may be used and implemented to perform these steps, such as a machine learning tool or trainer.

At step 602, the accent and dialect modifier can input two or more dialect voice samples retrieved from a training archive. One dialect can be the independent variable y and a variety of different dialect samples used to train the machine learning model to identify significant correlations with the chosen dependent dialect x. The variable dialect y with the highest correlation with achieving a desirable outcome label can become the target dialect pairing for the dependent dialect x. In some embodiments, the accent and dialect modifier can input a plurality of dialect voice samples. In some embodiments, the dialect voice samples can be the output of entire conversations or conversation fragments.

At step 604, the accent and dialect modifier can label outcomes and dialect strength. In some embodiments, labeling outcomes and dialect strength can be customized on a per context basis. For example, a label could be a closing sale in the banking industry, customer satisfaction ratings in the insurance industry, or a trustworthiness or friendliness rating. The label contributes to the context, as well as the performance of the dialect pairing within that context. In some embodiments, the accent and dialect modifier can assign value associated with the dialect strength. In some embodiments, the accent and dialect modifier can tag an entire conversation or a conversation fragment with a certain label corresponding to the outcome of the conversation in achieving a particular goal. The accent and dialect modifier can label the dialect strength of certain words or conversation fragments. In some embodiments, the accent and dialect modifier can query the database to obtain instructions, data or information to label outcomes and dialect strength. In some embodiments, the accent and dialect modifier can label outcomes and dialect strength of all the words in a conversation, conversation packet or voice data packet. In some implementations, the accent and dialect modifier can receive the outputs of the database query.

At step 606, the accent and dialect modifier can define dialect feature values of the dialect. In some embodiments, a feature value includes a measurable property or characteristic of a phenomenon being observed. For example, a feature value of a dialect can include the strength of the dialect, the unique qualities of the dialect that distinguish the dialect from other dialects, and the variation in pronunciation of the same dialect by different speakers. In some embodiments, feature values include a measurable property or characteristic of a phenomenon being observed. In some embodiments, the accent and dialect modifier can query the database to obtain instructions, data or information to define dialect feature values. In some embodiments, the accent and dialect modifier can define the dialect feature values of all the words in a conversation, conversation packet or voice data packet.

At step 608, the accent and dialect modifier can transcribe voice data samples. For example, input dialects and accents can be transcribed by an automatic speech recognition engine and speech-to-text service. In some embodiments, the frequency of individual words can be correlated with their respective dialects. In some embodiments, transcribing voice data samples can include converting a packet of information containing audio signals to a packet of information containing text and/or annotations. For example, a transcribed voice data sample can include annotations that mark how a word is pronounced. In some embodiments, the accent and dialect modifier can query the database to obtain instructions, data or information to define transcribe voice data samples based on which language, accent and/or dialect the voice data sample originates.

At step 610, the accent and dialect modifier can output a dialect strength determination model. In some embodiments, a dialect strength determination model takes the feature values of a dialect and assigns the strength of an input dialect with a target dialect. In some embodiments, the dialect strength determination model assigns a rating to an input dialect based on the input dialect's quantifiable distance from a target dialect. For example, the accent and dialect modifier can take the dialect strength from step 604 and associated feature values of step 606 to output a mapping that defines a relationship between dialect strength and the feature mappings. In some embodiments, the accent and dialect modifier can query the database to obtain instructions, data or information to output a dialect strength determination model. In some embodiments, the accent and dialect modifier can output a dialect strength determination model based on one or more of the words in a conversation, conversation packet or voice data packet.

At step 612, the accent and dialect modifier can input outcomes and voice data samples into a machine learning model. In some embodiments, the accent and dialect modifier can send a plurality of data packets to the machine learning model to use as a training dataset, validation dataset or test dataset. In some embodiments, the accent and dialect modifier can use a voice data sample that is a fragment of a conversation or an entire conversation. In some embodiments, the accent and dialect modifier can input outcomes into a machine learning model at a given time interval set by an administrator or user. In some embodiments, the accent and dialect modifier can query the database to obtain instructions, data or information to input outcomes and voice data samples into a machine learning model. In some embodiments, the accent and dialect modifier can input outcomes and voice data samples based on all the words in a conversation, conversation packet or voice data packet. In some embodiments, the accent and dialect modifier can make a request or selection to the database based on the outcomes and voice data samples to locate a suitable machine learning model.

At step 614, the accent and dialect modifier can output an accent and dialect pairing model. In some embodiments, an accent and dialect pairing model can include a range of dialect pairings, a range of contexts, and the probability for success with those variables. In some embodiments, the accent and dialect modifier can output an accent and dialect pairing model that gets processed to determine which modified data packets are sent over the communication network to the participant of a conversation. In some embodiments, the accent and dialect modifier identifies whether a suitable or sufficient accent and dialect pairing is available or selected and outputs the resulting pairing. In some embodiments, a pairing is sufficient if the accent and dialect strength of the user is within a predetermined threshold of the target accent and dialect defined by a model. In some embodiments, an algorithm will measure each individual word in the conversation to determine which words to modify. The accent and dialect modifier may output a suboptimal accent and dialect pairing in some embodiments. In other embodiments, the accent and dialect modifier may output or use a default dialect/accent pairing if an optimal accent/dialect pairing is not available or otherwise selectable in time for use for or during the conversation.

In some embodiments, the input voice data is manually labelled with a value the accent and dialect strength. For example, if the audio sample was had a very strong American accent, the label could be given a value of 5 on a scale of 1-5. The prosodic vocal features and characteristics of the dialects can be extracted from the audio samples, using preprocessing tools to convert the audio sample waveforms into a spectrogram or (mel-frequency cepstral coefficients) MFCC, and a machine learning algorithm can be applied to the audio representations to determine a correlation between the prosodic vocal features of the audio samples and the input dialects. In some embodiments, the defined features and vocal characteristics of a dialect, the label of how strong the dialect is can be correlated with the various features associated with each dialect. In some embodiments, the output is a model which can determine the probability of the qualitative perception of the strength of a new input dialect, which can be used in conjunction with the database. The database can identify a correlation between the strength of an accent or dialect with the desired outcome label. In some embodiments, the goal is to determine the optimal pairing between a dialect used over an entire conversation.

In some embodiments, the goal is to determine the accent or dialect of individual words and their correlation with achieving a desired outcome. For example, in situations where it is not necessary to modify the accent or dialect of every word in a conversation, determining the accent or dialect of individual words and their correlation with achieving a desired outcome would be useful. In some embodiments, determining the perceived strength of an accent of an individual word can be used in a situation where a distance vector between the target accent strength of a word and the actual accent strength of a word can be determined to provide instructions to the modification model for how much to modify the individually spoken word.

At step 616, the accent and dialect modifier can partition the voice data samples into individual words. In some embodiments, words can be split into individual sound samples 616. In some embodiments, the accent and dialect modifier can partition the voice data samples in a batch mode of multiple data packets. In some embodiments, the accent and dialect modifier can partition the voice data samples into individual words one data packet at a time. In some embodiments, the accent and dialect modifier can partition the voice data samples over a regular or irregular interval in time and frequency space. In some embodiments, the accent and dialect modifier can query the database to obtain instructions, data or information to partition the voice data samples. In some embodiments, the accent and dialect modifier can partition the voice data samples based on the transcribed voice data samples.

At step 618, the accent and dialect modifier can label the accent and dialect strength model. For example, individual word sound samples may be expressed in a context of an example sentence or used in small sound examples of just the word, as long as they are sufficient enough for a user to label their perception of how strong the accent or dialect is in the expressed individual sound sample. In some embodiments, the individual word sound samples can be categorized into their respective labels of perceived dialect and accent strength. In some embodiments, the accent and dialect modifier can query the database to obtain instructions, data or information to label the accent and dialect strength model. In some embodiments, the accent and dialect modifier can label the accent and dialect strength model based on the partitioned voice data sample. In some embodiments, the features of the vocal characteristics in each category can be analyzed by a supervised neural network and the identified vocal characteristics correlated with their respective accent and dialect strength category labels.

At step 620, the accent and dialect modifier can define feature values of words. For example, prosodic vocal features and characteristics of individual word dialects can be extracted from the individual word audio samples using preprocessing tools to convert the audio sample waveforms into a spectrogram of MFCC. In some embodiments, the accent and dialect modifier can query the database to obtain instructions, data or information to define feature values of words. In some embodiments, the accent and dialect modifier can define the feature values of all the words in a conversation, conversation packet or voice data packet. In some embodiments, the accent and dialect modifier can define the feature values of a subset of words. In some embodiments, the accent and dialect modifier can query the database to obtain instructions, data or information to define feature values of words. In some embodiments, the accent and dialect modifier can define feature values based on the outcome labels and dialect strength. In some embodiments, defining feature values of words can include identifying unique characteristics of a word that distinguish the word from other words.

At step 622, the accent and dialect modifier can input the feature values of words into a machine learning model. For example, a machine learning algorithm can be applied to the audio representations to determine a correlation between the prosodic vocal features of the audio samples and the input of individual words 622. In some embodiments, the accent and dialect modifier can use the feature values of words as a training dataset, a validation dataset or a test dataset. In some implementations, the machine learning model can include a plurality of machine learning models. In some embodiments, the accent and dialect modifier can query the database to obtain instructions, data or information to input the feature values of words into a machine learning model. In some embodiments, the accent and dialect modifier can input the feature values of words based on the transcribed voice defined feature values. In some implementations, the machine learning model that the accent and dialect modifier inputs the feature values of words into can change during a conversation.

At step 624, the accent and dialect modifier can output a word strength determination model. The output of the machine learning process can include a model 624 which can determine the probability of the qualitative perception of the strength of a new input word. In some embodiments, the accent and dialect modifier can query a model or the database to output a word strength determination model. In some embodiments, a word strength determination model can include a plurality of word strength determination models. In some embodiments, the accent and dialect modifier can store the word strength determination model in memory or storage on the computing device. One benefit of having the word strength determination model located on a local machine installed with the software application of the accent and dialect modifier is decreasing latency and saving bandwidth (for example, bandwidth would be required to access information between a computing device and a cloud server).

At step 628, the accent and dialect modifier can output a word frequency. In some embodiments, the word frequency can be an output of the transcribed voice data samples 608. In some embodiments, the accent and dialect modifier can send a packet of information to the database which contains instructions to output a word frequency. In some embodiments, the accent and dialect modifier can be awaiting further instructions to receive or retrieve information packets from the database. In some implementations, the accent and dialect modifier can output a word frequency that corresponds to a conversation fragment or an entire conversation. In some implementations, the input dialects and accents are transcribed by an automatic speech recognition engine and speech-to-text service where the frequency of individual words can be correlated with their respective dialects. For example, word frequency can be correlated with their respective dialect strengths. Word frequency can also be useful to derive communication and behavioral insights into how often different words are used in different contexts (e.g. for determining an inclusion into commercial dictionaries or linguistic insights).

Figure 7:
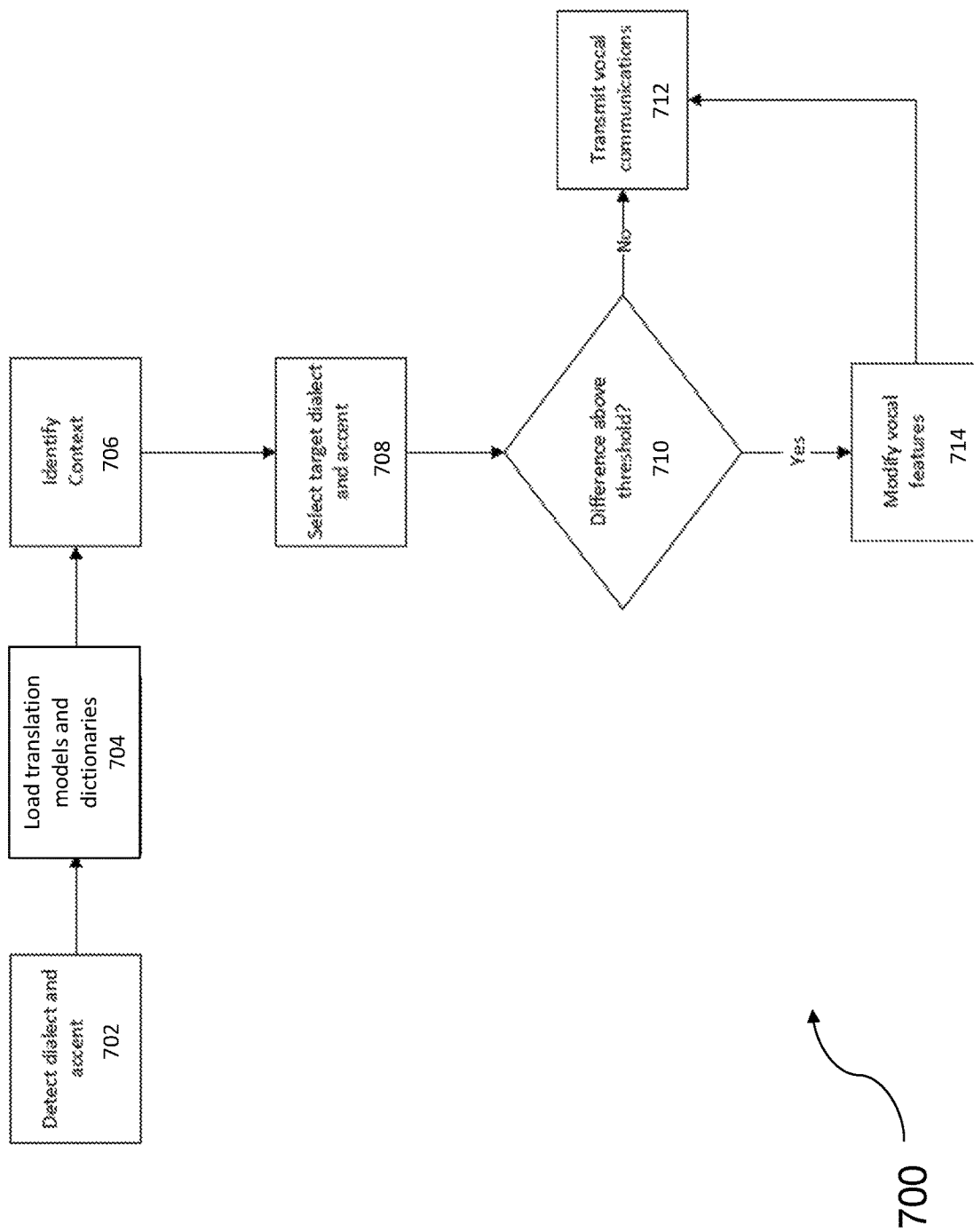
FIG. 7 is a flow diagram illustrating an example embodiment of a method for selecting a target dialect and accent to use to modify voice communications based on context.

FIG. 7 is a flow diagram illustrating an example embodiment of a method 700 for selecting a target dialect and accent to use to modify voice communications at least based on context. In brief overview, the method 700 can comprise detecting a dialect and accent 702, loading translation models and dictionaries 704, identifying context 706, selecting a target dialect and accent 708, determining if the difference between the target accent and/or dialect differs from the accent/and or dialect of the pre-modified voice communications is above a threshold 710, modifying vocal features 714 and transmitting vocal communications 712.

At step 702, the accent and dialect modifier detects a dialect and/or accent of any one or more of the participants in a conversation. In some implementations, detecting a dialect and/or accent can include detecting a first dialect and a first accent of a first voice in voice communications of a first participant of a plurality of participants participating in voice communications with a second participant of the plurality of participants detect to have a second voice with a second dialect and a second accent. In some embodiments, detecting a dialect and accent can include detecting the dialect only of one or more of the participants. In some embodiments, detecting a dialect and accent can include detecting the accent only of the one or more participants. In some embodiments, the dialect and accent modifier processes data packets carrying the audio signals to determine the dialect and/or accent of the word, phrase, sentence or conversation. The accent and dialect modifier may detect the accent and/or dialect as described in any of the embodiments of step 502.

At step 704, the accent and dialect modifier loads translation models and dictionaries. Loading translation models and dictionaries 704 can include preparing relative translation models and dictionaries that are to be accessed and used for the appropriate target dialect and/or accent, such as the dialect and/or accent to be selected for the context. The accent and dialect modifier may load translation models and dictionaries as described in any of the embodiments of step 504.

At step 706, the accent and dialect modifier, such as via context selector, identifies a context for the call or conversation. In some embodiments, identifying context 706 can include identifying a context of voice communications. In some embodiments, the accent and dialect modifier can receive information about the context from meta tags of the one or more data packets containing audio signals of the conversation. In some embodiments, the context selector 320 can identify determine, assign or select the context to the call, situation or conversations, such as via a selection via a user interface or from configuration of the accent and dialect modifier. In some implementations, the context selector accesses the database to identify a context to use for the call or conversation. The context selector may query the database to return a context based on any one or more parameters, such as information about the call or the participants. In some implementations, the context selector 320 selects the context without any user input at the context selection step, such as in an automated fashion based on configuration of the system, detection of meta-data related to the call or conversation, detection of words in audio during a conversation, identification of phone numbers, contact information or other attributes of the participants.

At step 708, the accent and dialect modifier selects a target dialect and/or accent. In some embodiments, selecting a target dialect and/or accent 708 can include selecting a target dialect and a target accent for voice communication of a first participant at least based on context, such as the context selected at step 706. In some embodiments, selecting a target dialect and accent 708 include selecting a target dialect and a target accent for voice communication of a first participant based on context further comprises identifying, by the device based on the context, one of a translation model, a translation dictionary or a translation database for the target dialect and the target accent. In some embodiments, selecting a target dialect and accent 708 includes selecting, by the device, a target dialect and a target accent for voice communication of the first participant based on the context further comprises selecting, by the device, the target dialect and the target accent based on the context and at least one of the first accent and the first dialect or the second accent and the second dialect. In some embodiments, selecting a target dialect and accent 708 can include selecting a target dialect separate from selecting a target accent. In some embodiments, the accent and dialect modifier selects from a plurality of available target dialects and/or accents, such as based on probabilities for the outcome, information about the call, the participants or the context. In some embodiments, a target dialect and/or accent is determined by an administrator or a user or participant associated with the call or conversation, such as via a user interface to the context selector or the accent and dialect modifier. In some embodiments, a target dialect and/or accent is determined by as the output of a machine learning model.

At step 710, the accent and dialect modifier can determine if the dialect and the accent of the participant, such as user 200, differs from the target dialect and the target accent by a predetermined threshold. In some embodiments, at the end of a step involving selecting a target dialect and accent 708, a comparison can be made involving determining, by an accent and dialect modifier, that the dialect and the accent differs from the target dialect and the target accent by a predetermined threshold 710. If the difference between the dialect and the accent differs from the target dialect and the target accent by an amount below the target threshold, vocal communications can be transmitted 712. If the difference between the dialect and the accent differs from the target dialect and the target accent by an amount equal to or above the target threshold, modification of vocal features 714 can take place. In some embodiments, the threshold is predetermined by an administrator or user, or is the output of a machine learning model. In some embodiments, the accent and dialect modifier can assign a value to the vector associated with the target dialect and/or accent and can assign a value associated with the first dialect and/or accent. In some embodiments, the accent and dialect modifier can compare the length or the magnitude of the vectors associated with the target dialect and/or accent and the first dialect and/or accent.

At step 712, the accent and dialect modifier transmit vocal communications either unmodified or modified. In some embodiments, the difference between the dialect and the accent of the participant differs from the target dialect and the target accent by below the target threshold and vocal communications are transmitted 712. For example, the dialect and the accent does not need to be modified because the target dialect and target accent are similar or matched to the dialect and accent of the participant. In these cases, the accent and dialect modifier may forward the voice communications, or packets carrying the audio content or signals for the same, in their original form. In some cases, the accent and dialect modifier may forward the voice communications, or packets carrying the audio content or signals for the same, in their modified form to implement the target dialect and/or accent. In other embodiments, the accent and dialect modifier may modify vocal features unrelated to the accent and/or dialect and forward the voice communications, or packets carrying the audio content or signals for the same, in this modified form.

At step 714, the accent and dialect modifier can modify any portions of the vocal communications, such as by using the translation models and dictionaries. As previously described herein, the accent and dialect modifier can modify any portions of any granularity of the voice communications, from sounds to words to sentence structure for example. In some embodiments, the difference between the first dialect and the first accent differs from the target dialect and the target accent by an amount equal to or above the target threshold and voice modifications occur. In some embodiments, modifying vocal features 714 can include modifying the dialect and/or accent of at least a portion of the voice communication. In some embodiments, modifying vocal features 714 can include modifying the dialect separate from modifying the accent of a voice communication. In some embodiments, modifying vocal features 714 can include modifying the dialect only. In some embodiments, modifying vocal features 714 can include modifying the accent only. In some embodiments, modifying the vocal features includes replacing any of the data representing such vocal features in the audio content or signals with data representing the desired dialect and/or accent. In some embodiments, modifying the vocal features includes modifying any of the data representing such vocal features in the audio content or signals to implement the desired dialect and/or context. In some embodiments, vocal communications are transmitted 712 responsive to modification, upon or after vocal features are modified 714.

Figure 8:
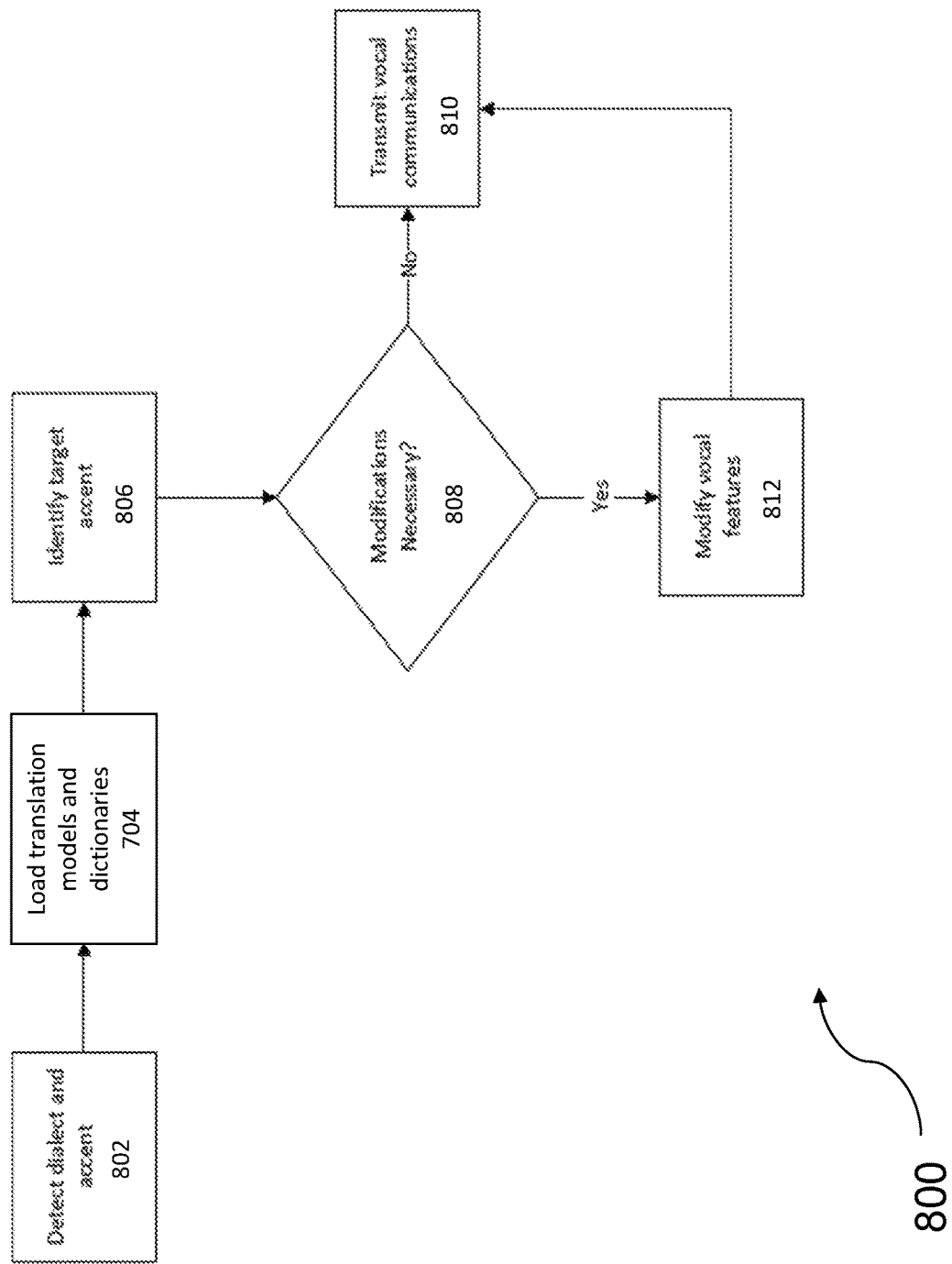
FIG. 8 is a flow diagram illustrating an example embodiment of a method of selectively modifying one or more words in voice communications in one dialect and accent with one or more vocal features of a different accent.

FIG. 8 is a flow diagram illustrating an example embodiment of a method 800 of selectively modifying one or more words in voice communications in one dialect and accent with one or more vocal features of a different accent. In brief overview, the method 800 can comprise detecting a dialect and accent 802, loading translation models and dictionaries 804, identifying a target accent and dialect 806, determining whether modifications are necessary, useful or desired 808, modifying vocal features 812, and transmitting vocal communications 810.

At step 802, the accent and dialect modifier detects a dialect and/or accent of any one or more of the participants 200/240. In some implementations, detecting a dialect and/or accent can include detecting a first dialect and a first accent of a first voice in voice communications of a first participant of a plurality of participants participating in voice communications with a second participant of the plurality of participants detected to have a second voice with a second dialect and a second accent. In some embodiments, detecting a dialect and accent can include detecting the dialect only. In some embodiments, detecting a dialect and accent can include detecting the accent only. In some embodiments, the dialect and accent modifier processes data packets carrying the audio signals to determine the dialect and/or accent of the word, phrase, sentence or conversation. In some embodiments, the accent and dialect modifier store the information pertaining to the detected accent and/or dialects in memory on the computing device or uses the information to process subsequent information from the database.

At step 804, the accent and dialect modifier loads translation models and dictionaries. Loading translation models and dictionaries 604 can include obtaining and/or preparing relative translation models and dictionaries be accessed and used for the appropriate target dialect and accent. In some embodiments, loading the translation models and dictionaries 604 can include making a copy of the translation models and dictionaries available in storage or memory of the computing device of the accent and dialect modifier. In some embodiments, loading the translation models and dictionaries 604 can include accessing a server or the database to retrieve relevant translation models and dictionaries. In some embodiments, loading translation models and dictionaries 604 occurs before a user is engaged in a conversation. For example, the translation models and dictionaries can be loaded onto a user's computer before a conversation begins with another participant. In some embodiments, loading translation models can occur separately from loading dictionaries. In some embodiments, the accent and dialect modifier determines that a translation model is relevant by processing the voice communications received to identify which language and context the accent and dialect modifier should access and/or use. In some embodiments, the accent and dialect modifier loads relevant translation models and dictionaries at the beginning of a conversation or during the conversation.

At step 806, the accent and dialect modifier identifies a target accent to selectively modify the one or more words in the voice communications in the accent (e.g., a first accent) of the participant to the target accent. In some embodiments, identifying a target accent 806 can include identifying a target accent to selectively modify the one or more words in the voice communications in the first accent to the target accent based on a context for the voice communications. In some embodiments, identifying a target accent 806 can include identifying a target accent to selectively modify the one or more words in the voice communications in the first accent to the target based on the context and second dialect and/or a second accent of voice communications of the second participant. In some embodiments, identifying a target accent 806 can include identifying a target accent and a target dialect to selectively modify the one or more words in the voice communications in the first accent and dialect to the target accent and dialect.

At step 808, the accent and dialect modifier determines whether modifications to the first dialect and/or accent are necessary, desirable or useful, such as for the context or outcome of the call. The accent and dialect modifier may determine modifications are desired or useful on any portion of the voice communication, from a sound, word or words, series of words or sentence structure. In some embodiments, the accent and dialect modifier determines that a target accent and/or dialect and the original accent/and or dialect are different beyond a threshold value. Responsive to such determination such differences beyond a threshold, the accent and dialect modifier modifies portions of the voice communications accordingly.

At step 810, the accent and dialect modifier transmits vocal communications. Transmitting vocal communications 810 can include communicating voice communications comprising the modified one or more words via the communication channel to the communication device. In some embodiments, transmitting vocal communications 810 occurs as a response to identifying that modifications to vocal communications are not necessary. For example, the dialect and the accent of the participant does not need to be modified because the target dialect and target accent are similar or matched to the participant's dialect and accent. In some embodiments, the accent and dialect modifier transmits vocal communications that are modified in accordance with step 812.

At step 812, the accent and dialect modifier modifies vocal features 812. The accent and dialect modifier may modify any data of the audio content or voice signal representing the vocal features to implement the desired accent and/or dialect. The accent and dialect modifier may replace any data of the audio content or voice signal representing the vocal features to implement the desired accent and/or dialect. Modifying vocal features 812 can occur as a response to identifying that modifications are suitable, desired or necessary for the context or to produce the desired outcome. In some embodiments, modifying vocal features 812 includes modifying one or more vocal features of the voice communication of the one or more words in the accent of the participant to a corresponding one or more vocal features of the target accent. In some embodiments, modifying vocal features 812 includes modifying one or more vocal features of the voice communication of the one or more words in the participant's accent to the target accent using the target accent selected based on the context for the voice communications. In some embodiments, modifying vocal features 812 includes modifying one or more vocal features of the voice communications of the one or more words in the participant's accent to a corresponding one or more vocal features of the target accent further to have the one or more words be pronounced by the participant in the target accent. In some embodiments, modifying vocal features 812 includes modifying one or more vocal features of the voice communication of the one or more words in the participant's accent to a corresponding one or more vocal features of the target accent and dialect to be pronounced in the target dialect. In some embodiments, modifying vocal features 812 includes modifying one or more vocal features of the voice communication of the one or more words in the participant's accent to a corresponding one or more vocal features of the target accent by replacing selected one or more words with one or more words in the target dialect.

It should be noted that certain passages of this disclosure may reference terms such as "first" and "second" in connection participants, users, devices, accents, dialects, contexts, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed:

1. A method for selecting a target dialect and accent to use to modify voice communications based on a context, the method comprising:
   (a) detecting, by a device, a first dialect and a first accent of a first voice in voice communications of a first participant of a plurality of participants participating in voice communications with a second participant of the plurality of participants detected to have a second voice with a second dialect and a second accent;
   (b) identifying, by the device, a context of the voice communications;
   (c) selecting, by the device, a target dialect and a target accent for voice communication of the first participant based at least on the context;
   (d) determining, by the device, that the first dialect and the first accent differs from the target dialect and the target accent by a predetermined threshold; and
   (e) causing, by the device responsive to the determination, modification of at least a portion of voice communications of the first participant to use the target dialect and the target accent.

2. The method of claim 1, wherein one of the target dialect is different from the first dialect and the second dialect or the target accent is different from the first accent and the second accent.

3. The method of claim 1, wherein the device facilitates a communication channel providing the voice communications between communication devices of the plurality of participants.

4. The method of claim 1, wherein the context comprises a type of call, the type of call comprising one of the following: a sales call, a service call and a support call.

5. The method of claim 1, wherein the context comprises a selected outcome for the voice communications.

6. The method of claim 1, wherein the context comprises one of an age, an industry or a geography associated with the voice communications.

7. The method of claim 1, wherein (c) further comprises identifying, by the device based at least on the context, one of a translation model, a translation dictionary or a translation database for the target dialect and the target accent.

8. The method of claim 1, wherein (c) further comprises selecting, by the device, the target dialect and the target accent based on the context and at least one of the first accent and the first dialect or the second accent and the second dialect.

9. The method of claim 1, wherein (c) further comprises selecting, by the device, the target dialect and the target accent based on one or more models trained with pairings of a plurality of dialects and accents for a plurality of contexts.

10. A system for selecting a target dialect and accent to use to modify voice communications for a context, the system comprising:
    a device comprising one or more processors, coupled to memory and configured to:
    detect a first dialect and a first accent of a first voice in voice communications of a first participant of a plurality of participants participating in voice communications with a second participant of the plurality of participants detected to have a second voice with a second dialect and a second accent;
    identify a context of the voice communications;
    select a target dialect and a target accent for voice communications of the first participant based at least on the context;
    determine that the first dialect and the first accent differs from the target dialect and the target accent by a predetermined threshold; and
    cause, responsive to the determination, modification of at least a portion of voice communications of the first participant to use the target dialect and the target accent.

11. The system of claim 10, wherein the device is further configured to facilitate a communication channel for providing the voice communications between communication devices of the plurality of participants.

12. The system of claim 11, wherein the context comprises a type of call and a selected outcome for the type of call, the type of call comprising one of the following: a sales call, a service call and a support call.

13. The system of claim 11, wherein the context comprises one of an age, an industry or a geography associated with the voice communications.

14. The system of claim 11, wherein the device is further configured to select the target dialect and the target accent based on the context and at least one of the first accent and the first dialect or the second accent and the second dialect.

15. The system of claim 11, wherein the device is further configured to select the target dialect and the target accent based on one or more models trained with pairings of a plurality of dialects and accents for a plurality of contexts.

16. A non-transitory computer readable medium storing program instructions for causing one or more processors to:
    detect a first dialect and a first accent of a first voice in voice communications of a first participant of a plurality of participants participating in voice communications with a second participant of the plurality of participants having a second voice with a second dialect and a second accent;
    identify a context of the voice communications;
    select a target dialect and a target accent for voice communications of the first participant based at least on the context;
    determine that the first dialect and the first accent differs from the target dialect and the target accent by a predetermined threshold; and cause, responsive to the determination, modification of at least a portion of voice communications of the first participant to use the target dialect and the target accent.

17. The non-transitory computer readable medium of claim 16, wherein the program instructions further cause the one or more processors to select the target dialect and the target accent based on the context and at least one of the first accent and the first dialect or the second accent and the second dialect.

18. The non-transitory computer readable medium of claim 16, wherein the program instructions further cause the one or more processors to select the target dialect and the target accent based on one or more models trained with pairings of a plurality of dialects and accents for a plurality of contexts.

19. The non-transitory computer readable medium of claim 16, wherein the context comprises a type of call and a selected outcome for the type of call, the type of call comprising one of the following: a sales call, a service call and a support call.

20. The non-transitory computer readable medium of claim 16, wherein the context comprises one of an age, an industry or a geography associated with the voice communications.

* * * * *